US008433573B2

(12) United States Patent
Murase et al.

(10) Patent No.: US 8,433,573 B2
(45) Date of Patent: Apr. 30, 2013

(54) PROSODY MODIFICATION DEVICE, PROSODY MODIFICATION METHOD, AND RECORDING MEDIUM STORING PROSODY MODIFICATION PROGRAM

(75) Inventors: Kentaro Murase, Kawasaki (JP); Nobuyuki Katae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1173 days.

(21) Appl. No.: 12/029,316

(22) Filed: Feb. 11, 2008

(65) Prior Publication Data

US 2008/0235025 A1 Sep. 25, 2008

(30) Foreign Application Priority Data

Mar. 20, 2007 (JP) ................................ 2007-073082

(51) Int. Cl.

| | |
|---|---|
| ***G10L 13/08*** | (2006.01) |
| ***G10L 13/00*** | (2006.01) |
| ***G10L 15/04*** | (2006.01) |
| ***G10L 13/06*** | (2006.01) |
| ***G10L 15/28*** | (2006.01) |
| ***G10L 15/00*** | (2006.01) |
| ***G10L 21/00*** | (2006.01) |
| ***G10L 15/26*** | (2006.01) |

(52) U.S. Cl.

USPC ........... 704/260; 704/261; 704/258; 704/254; 704/267; 704/268; 704/269; 704/259; 704/255; 704/257; 704/270; 704/231; 704/235; 704/270.1

(58) Field of Classification Search .................. 704/260, 704/261, 258, 254, 267, 266, 268, 269, 259, 704/255, 257, 270, 231, 235, 270.1

See application file for complete search history.

(56) References Cited

U.S. PATENT DOCUMENTS 5,113,449 A * 5/1992 Blanton et al. ................ 704/261
5,636,325 A * 6/1997 Farrett .......................... 704/258

(Continued)

FOREIGN PATENT DOCUMENTS

JP A 7-140996 6/1995
JP A 9-292897 11/1997

(Continued)

OTHER PUBLICATIONS

Official Action issued on Aug. 4, 2010, in corresponding Chinese Patent Application No. 200810086741.0.

(Continued)

*Primary Examiner* — Edgar Guerra-Erazo
(74) *Attorney, Agent, or Firm* — Greer, Burns & Crain, Ltd.

(57) ABSTRACT

A prosody modification device includes: a real voice prosody input part that receives real voice prosody information extracted from an utterance of a human; a regular prosody generating part that generates regular prosody information having a regular phoneme boundary that determines a boundary between phonemes and a regular phoneme length of a phoneme by using data representing a regular or statistical phoneme length in an utterance of a human with respect to a section including at least a phoneme or a phoneme string to be modified in the real voice prosody information; and a real voice prosody modification part that resets a real voice phoneme boundary by using the generated regular prosody information so that the real voice phoneme boundary and a real voice phoneme length of the phoneme or the phoneme string to be modified in the real voice prosody information are approximate to an actual phoneme boundary and an actual phoneme length of the utterance of the human, thereby modifying the real voice prosody information.

11 Claims, 20 Drawing Sheets

U.S. PATENT DOCUMENTS

| | | | | | |
|---|---|---|---|---|---|
| 5,682,502 | A * | 10/1997 | Ohtsuka et al. | 704/267 |
| 5,940,797 | A | 8/1999 | Abe | |
| 6,006,187 | A * | 12/1999 | Tanenblatt | 704/260 |
| 6,029,131 | A * | 2/2000 | Bruckert | 704/260 |
| 6,078,885 | A * | 6/2000 | Beutnagel | 704/258 |
| 6,405,169 | B1 * | 6/2002 | Kondo et al. | 704/258 |
| 6,778,962 | B1 * | 8/2004 | Kasai et al. | 704/266 |
| 6,823,309 | B1 * | 11/2004 | Kato et al. | 704/267 |
| 7,483,832 | B2 * | 1/2009 | Tischer | 704/260 |
| 7,552,052 | B2 * | 6/2009 | Kemmochi | 704/258 |
| 7,742,921 | B1 * | 6/2010 | Davis et al. | 704/270 |
| 7,765,103 | B2 * | 7/2010 | Yamazaki | 704/259 |
| 7,962,341 | B2 * | 6/2011 | Braunschweiler | 704/258 |
| 2004/0193421 | A1 * | 9/2004 | Blass | 704/258 |
| 2005/0060158 | A1 * | 3/2005 | Endo et al. | 704/275 |
| 2005/0261905 | A1 * | 11/2005 | Pyo et al. | 704/252 |
| 2008/0140407 | A1 * | 6/2008 | Aylett et al. | 704/260 |
| 2008/0167875 | A1 * | 7/2008 | Bakis et al. | 704/258 |
| 2008/0195391 | A1 * | 8/2008 | Marple et al. | 704/260 |
| 2009/0204395 | A1 * | 8/2009 | Kato et al. | 704/206 |
| 2009/0228271 | A1 * | 9/2009 | DeSimone | 704/231 |

FOREIGN PATENT DOCUMENTS

| | | |
|---|---|---|
| JP | A 11-143483 | 5/1999 |
| JP | 2003-186489 | 7/2003 |

OTHER PUBLICATIONS

Wang Lijuan, et al.; "Automatic Segmentation for TTS Units" Microelectronics and calculating machine, pp. 8-11, No. 12, vol. 22; Dec. 31, 2005.

Kazuhiro Arai et al.; "A speech labeling system based on knowledge processing"; Institute of Electronics, Information and Communication Engineers (IEICE) Transactions, vol. J74-D-II, No. 2 (Feb. 1991); pp. 130-141 with partial translation.

* cited by examiner

PROSODY MODIFICATION DEVICE, PROSODY MODIFICATION METHOD, AND RECORDING MEDIUM STORING PROSODY MODIFICATION PROGRAM

BACKGROUND OF THE INVENTION

1. Field of the Invention

The present invention relates to a prosody modification device including a real voice prosody input part that receives real voice prosody information extracted from an utterance of a human and a real voice prosody modification part that modifies the real voice prosody information received by the real voice prosody input part, a prosody modification method, and a recording medium storing a prosody modification program.

2. Description of Related Art

In recent years, various systems or apparatuses use a speech synthesis technology of converting character strings (text) into speech and outputting the obtained speech. For example, this technology is applied to IVR (Interactive Voice Response) systems, in-vehicle information terminals, and mobile phones so as to read guidance on an operating method or mail, support systems for visually impaired persons and speech impaired persons, and the like. However, with the current state of the speech synthesis technology, it is difficult to generate synthetic speech that is as natural and expressive as a human real voice.

The prosody of synthetic speech generally is determined by performing processes such as a morphogical analysis, i.e., an analysis of reading and a part of speech of a word in a character string, an analysis of a clause and a modification relation, the setting of an accent, an intonation, a pause, and a rate of speech, and the like. With the current state of processing technology, however, it is difficult to perform an analysis taking into consideration the meaning of a sentence and a context as accurately as a human, and an error may be involved in a result of the analysis. As a result, the prosody, which determines a manner of speaking such as a voice pitch, an intonation, a rhythm, and the like, of synthetic speech generated by the speech synthesis technology partially may be unnatural as compared with a human real voice.

To solve the above-described problem, the following method for improved quality of the prosody of synthetic speech is known. In the case where a character string to be converted into synthetic speech is predetermined, prosody information is extracted from an utterance of a human, and the synthetic speech is generated by using the extracted prosody information of a real voice as it is (for example, see JP 10(1998)-153998 A, JP 9(1997)-292897 A, JP 11(1999)-143483 A, and JP 7(1995)-140996 A). In this method, while the operation of extracting the human utterance and its prosody is required in advance, it is possible to generate synthetic speech as natural and expressive as a human real voice since the synthetic speech is generated by using the prosody information of the real voice extracted from the human utterance.

Meanwhile, in order to extract the prosody information from the human utterance, a phoneme boundary is set for each phoneme either by a manual operation or automatically by using DP (Dynamic Programming) matching, HMM (Hidden Markov Model), or the like.

In the former case, it is required that a human visually discriminates a phoneme boundary for each phoneme based on a displayed speech waveform to set the phoneme boundary, for example. This operation requires expert knowledge about speech and takes time and trouble.

On the other hand, in the latter case, the prosody information may be extracted erroneously, which means that an erroneous phoneme boundary is set. Even by using DP matching, HMM, or the like, it is sometimes difficult to set a correct phoneme boundary due to similar sounds and noises. When the prosody information is extracted from a real voice erroneously, prosodically unnatural synthetic speech is generated. Consequently, it is required to modify the erroneously extracted prosody information. In order to modify the erroneously extracted prosody information, it is required after all that a human visually confirms the automatically set phoneme boundary, and modifies the erroneously set phoneme boundary. This operation also requires expert knowledge about speech and takes time and trouble as in the former case.

SUMMARY OF THE INVENTION

The present invention has been achieved in view of the above problems, and its object is to provide a prosody modification device, a prosody modification method, and a recording medium storing a prosody modification program that make it possible to modify real voice prosody information extracted erroneously from an utterance of a human without impairment of the naturalness and expressiveness of a human real voice and without time and trouble.

In order to achieve the above object, a prosody modification device according to the present invention includes: a real voice prosody input part that receives real voice prosody information extracted from an utterance of a human; a regular prosody generating part that generates regular prosody information having a regular phoneme boundary that determines a boundary between phonemes and a regular phoneme length of a phoneme by using data representing a regular or statistical phoneme length in an utterance of a human with respect to a section including at least a phoneme or a phoneme string to be modified in the real voice prosody information; and a real voice prosody modification part that resets a real voice phoneme boundary of the phoneme or the phoneme string to be modified in the real voice prosody information by using the regular prosody information generated by the regular prosody generating part so that the real voice phoneme boundary and a real voice phoneme length of the phoneme or the phoneme string to be modified in the real voice prosody information are approximate to an actual phoneme boundary and an actual phoneme length of the utterance of the human, thereby modifying the real voice prosody information.

According to the prosody modification device of the present invention, the real voice prosody input part receives real voice prosody information extracted from an utterance of a human. The regular prosody generating part generates regular prosody information having a regular phoneme boundary that determines a boundary between phonemes and a regular phoneme length of a phoneme by using data representing a regular or statistical phoneme length in an utterance of a human with respect to a section including at least a phoneme or a phoneme string to be modified in the real voice prosody information. The real voice prosody modification part resets a real voice phoneme boundary of the phoneme or the phoneme string to be modified in the real voice prosody information by using the generated regular prosody information so that the real voice phoneme boundary and a real voice phoneme length of the phoneme or the phoneme string to be modified in the real voice prosody information are approximate to an actual phoneme boundary and an actual phoneme length of the utterance of the human, thereby modifying the real voice prosody information. Since the real voice phoneme boundary is reset so as to be approximate to an actual phoneme boundary of an utterance of a human, it is possible to modify the real voice prosody information extracted erroneously from the human utterance without impairment of the naturalness and expressiveness of a human real voice and without time and trouble.

Preferably, the prosody modification device according to the present invention includes a modification section determining part that determines the section of the phoneme or the phoneme string to be modified in the real voice prosody information based on a kind of a phoneme string of the real voice prosody information or the real voice phoneme length of each phoneme determined by the real voice phoneme boundary.

With the above-described configuration, the modification section determining part determines the section of the phoneme or the phoneme string to be modified in the real voice prosody information based on a kind of a phoneme string of the real voice prosody information or the real voice phoneme length. Therefore, the section of the phoneme or the phoneme string to be modified in the real voice prosody information can be limited to a portion where the real voice prosody information is likely to be extracted erroneously.

In the prosody modification device according to the present invention, preferably, the real voice prosody modification part includes a phoneme boundary resetting part that resets the real voice phoneme boundary of the phoneme or the phoneme string to be modified in the real voice prosody information based on a ratio of the regular phoneme length of each phoneme determined by the regular phoneme boundary in the section of the phoneme or the phoneme string to be modified, thereby modifying the real voice prosody information.

With the above-described configuration, the phoneme boundary resetting part resets the real voice phoneme boundary of the phoneme or the phoneme string to be modified in the real voice prosody information based on a ratio of the regular phoneme length of each phoneme determined by the regular phoneme boundary in the section, thereby modifying the real voice prosody information. For example, the phoneme boundary resetting part resets the real voice phoneme boundary of the real voice prosody information so that each real voice phoneme length in the section is approximate to the ratio of each regular phoneme length in the section, thereby modifying the real voice prosody information. In other words, the modified real voice prosody information comprehensively is based on the real voice phoneme length of each phoneme in the section, and locally has its real voice phoneme boundary reset based on the ratio of the regular phoneme length of each phoneme. Therefore, it is possible to modify the real voice prosody information extracted erroneously from a human utterance without impairment of the naturalness and expressiveness of a human real voice and without time and trouble.

In the prosody modification device according to the present invention, preferably, the real voice prosody modification part includes a phoneme boundary resetting part that resets the real voice phoneme boundary of the phoneme or the phoneme string to be modified in the real voice prosody information based on the regular phoneme length of each phoneme of the regular prosody information and a speech rate ratio as a ratio between a rate of speech of the real voice prosody information and a rate of speech of the regular prosody information in the section, thereby modifying the real voice prosody information.

With the above-described configuration, the phoneme boundary resetting part resets the real voice phoneme boundary of the phoneme or the phoneme string to be modified in the real voice prosody information based on the regular phoneme length of each phoneme of the regular prosody information and a speech rate ratio as a ratio between a rate of speech of the real voice prosody information and a rate of speech of the regular prosody information in the section of the phoneme or the phoneme string to be modified, thereby modifying the real voice prosody information. In this manner, since the real voice prosody information is modified based on the locally appropriate regular phoneme length and the speech rate ratio, the modified real voice prosody information comprehensively is close to an utterance in a real voice. As a result, it is possible to modify the real voice prosody information extracted erroneously from a human utterance without impairment of the naturalness and expressiveness of a human real voice and without time and trouble.

Preferably, the prosody modification device according to the present invention further includes a speech rate ratio detecting part that calculates, in a speech rate calculation range composed of at least one or more phonemes or morae including the phoneme to be modified in the real voice prosody information, the rate of speech of the real voice prosody information for the phoneme to be modified based on a total sum of the real voice phoneme lengths of respective phonemes determined by the real voice phoneme boundary and the number of phonemes or morae in the speech rate calculation range, as well as the rate of speech of the regular prosody information for the phoneme to be modified based on a total sum of the regular phoneme lengths of the respective phonemes determined by the regular phoneme boundary and the number of phonemes or morae in the speech rate calculation range, and calculates the ratio between the rate of speech of the real voice prosody information and the rate of speech of the regular prosody information as the speech rate ratio. The phoneme boundary resetting part preferably calculates a modified phoneme length based on the regular phoneme length of each of the phonemes of the regular prosody information and the speech rate ratio calculated by the speech rate ratio detecting part in the section of the phoneme or the phoneme string to be modified, and resets the real voice phoneme boundary of the real voice prosody information so that each real voice phoneme length in the section becomes the modified phoneme length, thereby modifying the real voice prosody information.

With the above-described configuration, the speech rate ratio detecting part calculates, in a speech rate calculation range, the rate of speech of the real voice prosody information for the phoneme to be modified based on a total sum of the real voice phoneme lengths of respective phonemes and the number of phonemes or morae in the speech rate calculation range. The speech rate ratio detecting part further calculates, in the speech rate calculation range, the rate of speech of the regular prosody information for the phoneme to be modified based on a total sum of the regular phoneme lengths of the respective phonemes and the number of phonemes or morae in the speech rate calculation range. Further, the speech rate ratio detecting part calculates the ratio between the rate of speech of the real voice prosody information and the rate of speech of the regular prosody information as the speech rate ratio. The phoneme boundary resetting part calculates a modified phoneme length based on the regular phoneme length of each of the phonemes and the calculated speech rate ratio in the section, and resets the real voice phoneme boundary of the real voice prosody information so that each real voice phoneme length in the section becomes the modified phoneme length, thereby modifying the real voice prosody information. In this manner, since the speech rate ratio is applied to the locally appropriate regular phoneme length, the modified real voice prosody information comprehensively is close to an utterance in a real voice. In other words, the modified real voice prosody information is prosody information in which a tendency of a human real voice to change due to a rhythm is reproduced. As a result, it is possible to modify the real voice prosody information extracted erroneously from a human utterance without impairment of the naturalness and expressiveness of a human real voice and without time and trouble.

Preferably, the prosody modification device according to the present invention further includes: a phoneme length ratio calculating part that calculates a ratio between the real voice phoneme length of each phoneme determined by the real voice phoneme boundary and the regular phoneme length of the phoneme determined by the regular phoneme boundary as a phoneme length ratio of the phoneme in the section of the phoneme or the phoneme string to be modified in the real voice prosody information; and a speech rate ratio calculating part that smoothes the phoneme length ratio calculated by the phoneme length ratio calculating part, thereby calculating the ratio between the rate of speech of the real voice prosody information and the rate of speech of the regular prosody information as the speech rate ratio. The phoneme boundary resetting part preferably calculates a modified phoneme length based on the regular phoneme length of the phoneme of the regular prosody information and the speech rate ratio calculated by the speech rate ratio calculating part in the section of the phoneme or the phoneme string to be modified, and resets the real voice phoneme boundary of the real voice prosody information so that each real voice phoneme length in the section becomes the modified phoneme length, thereby modifying the real voice prosody information.

With the above-described configuration, the phoneme length ratio calculating part calculates a ratio between the real voice phoneme length of each phoneme determined by the real voice phoneme boundary and the regular phoneme length of the phoneme determined by the regular phoneme boundary as a phoneme length ratio of the phoneme in the section. The speech rate ratio calculating part smoothes the calculated phoneme length ratio, thereby calculating the ratio between the rate of speech of the real voice prosody information and the rate of speech of the regular prosody information as the speech rate ratio. The phoneme boundary resetting part calculates a modified phoneme length based on the regular phoneme length of the phoneme of the regular prosody information and the calculated speech rate ratio in the section, and resets the real voice phoneme boundary of the real voice prosody information so that each real voice phoneme length in the section becomes the modified phoneme length, thereby modifying the real voice prosody information. In this manner, since the speech rate ratio is applied to the locally appropriate regular phoneme length, the modified real voice prosody information comprehensively is close to an utterance in a real voice. In other words, the modified real voice prosody information is prosody information in which a tendency of a human real voice to change due to a rhythm is reproduced. As a result, it is possible to modify the real voice prosody information extracted erroneously from a human utterance without impairment of the naturalness and expressiveness of a human real voice and without time and trouble.

Preferably, the prosody modification device according to the present invention includes: a real voice prosody storing part that stores the real voice prosody information received by the real voice prosody input part or the real voice prosody information modified by the real voice prosody modification part; and a convergence judging part that writes the real voice prosody information modified by the real voice prosody modification part in the real voice prosody storing part and instructs the real voice prosody modification part to modify the real voice prosody information when a difference between the real voice phoneme length of the real voice prosody information modified by the real voice prosody modification part and the real voice phoneme length of the unmodified real voice prosody information stored in the real voice prosody storing part is not less than a threshold value, as well as outputs the real voice prosody information modified by the real voice prosody modification part when the difference between the real voice phoneme length of the real voice prosody information modified by the real voice prosody modification part and the real voice phoneme length of the unmodified real voice prosody information stored in the real voice prosody storing part is less than the threshold value.

With the above-described configuration, the convergence judging part judges whether or not a difference between the real voice phoneme length of the real voice prosody information modified by the real voice prosody modification part and the real voice phoneme length of the unmodified real voice prosody information stored in the real voice prosody storing part is not less than a threshold value. When the difference is not less than the threshold value, the convergence judging part writes the real voice prosody information modified by the real voice prosody modification part in the real voice prosody storing part and instructs the real voice prosody modification part to modify the real voice prosody information. On the other hand, when the difference is less than the threshold value, the convergence judging part outputs the real voice prosody information modified by the real voice prosody modification part. As a result, the convergence judging part can output the real voice prosody information in which the real voice phoneme boundary is more approximate to an actual real voice phoneme boundary.

A GUI device according to the present invention allows the real voice prosody information modified by the above-described prosody modification device to be edited.

With the above-described configuration, the GUI device allows the real voice prosody information modified by the prosody modification device to be edited. Since the real voice prosody information modified by the prosody modification device is edited by the GUI device, an administrator can make a fine adjustment to the real voice prosody information, for example.

A speech synthesizer according to the present invention outputs synthetic speech generated based on the real voice prosody information modified by the above-described prosody modification device.

With the above-described configuration, the speech synthesizer can output synthetic speech generated based on the real voice prosody information modified by the prosody modification device.

A speech synthesizer according to the present invention outputs synthetic speech generated based on the real voice prosody information edited by the above-describe GUI device.

With the above-described configuration, the speech synthesizer can output synthetic speech generated based on the real voice prosody information edited by the GUI device.

In order to achieve the above object, a prosody modification method according to the present invention includes: a real voice prosody input operation in which a real voice prosody input part provided in a computer receives real voice prosody information extracted from an utterance of a human; a regular prosody generating operation in which a regular prosody generating part provided in the computer generates regular prosody information having a regular phoneme boundary that determines a boundary between phonemes and a regular phoneme length of a phoneme by using data representing a regular or statistical phoneme length in an utterance of a human with respect to a section including at least a phoneme or a phoneme string to be modified in the real voice prosody information; and a real voice prosody modifying operation in which a real voice prosody modification part provided in the computer resets a real voice phoneme boundary of the phoneme or the phoneme string to be modified in the real voice prosody information by using the regular prosody information generated in the regular prosody generating operation so that the real voice phoneme boundary and a real voice phoneme length of the phoneme or the phoneme string to be modified in the real voice prosody information are approximate to an actual phoneme boundary and an actual phoneme length of the utterance of the human, thereby modifying the real voice prosody information.

In order to achieve the above object, a recording medium storing a prosody modification program according to the present invention allows a computer to execute: a real voice prosody input process of receiving real voice prosody information extracted from an utterance of a human; a regular prosody generation process of generating regular prosody information having a regular phoneme boundary that determines a boundary between phonemes and a regular phoneme length of a phoneme by using data representing a regular or statistical phoneme length in an utterance of a human with respect to a section including at least a phoneme or a phoneme string to be modified in the real voice prosody information; and a real voice prosody modification process of resetting a real voice phoneme boundary of the phoneme or the phoneme string to be modified in the real voice prosody information by using the regular prosody information generated in the regular prosody generation process so that the real voice phoneme boundary and a real voice phoneme length of the phoneme or the phoneme string to be modified in the real voice prosody information are approximate to an actual phoneme boundary and an actual phoneme length of the utterance of the human, thereby modifying the real voice prosody information.

The prosody modification method and the recording medium storing a prosody modification program according to the present invention provide the same effects as those of the above-described prosody modification device.

DETAILED DESCRIPTION OF THE INVENTION

Hereinafter, the present invention will be described in detail by way of more specific embodiments with reference to the drawings.

[Embodiment 1]

Figure 1:
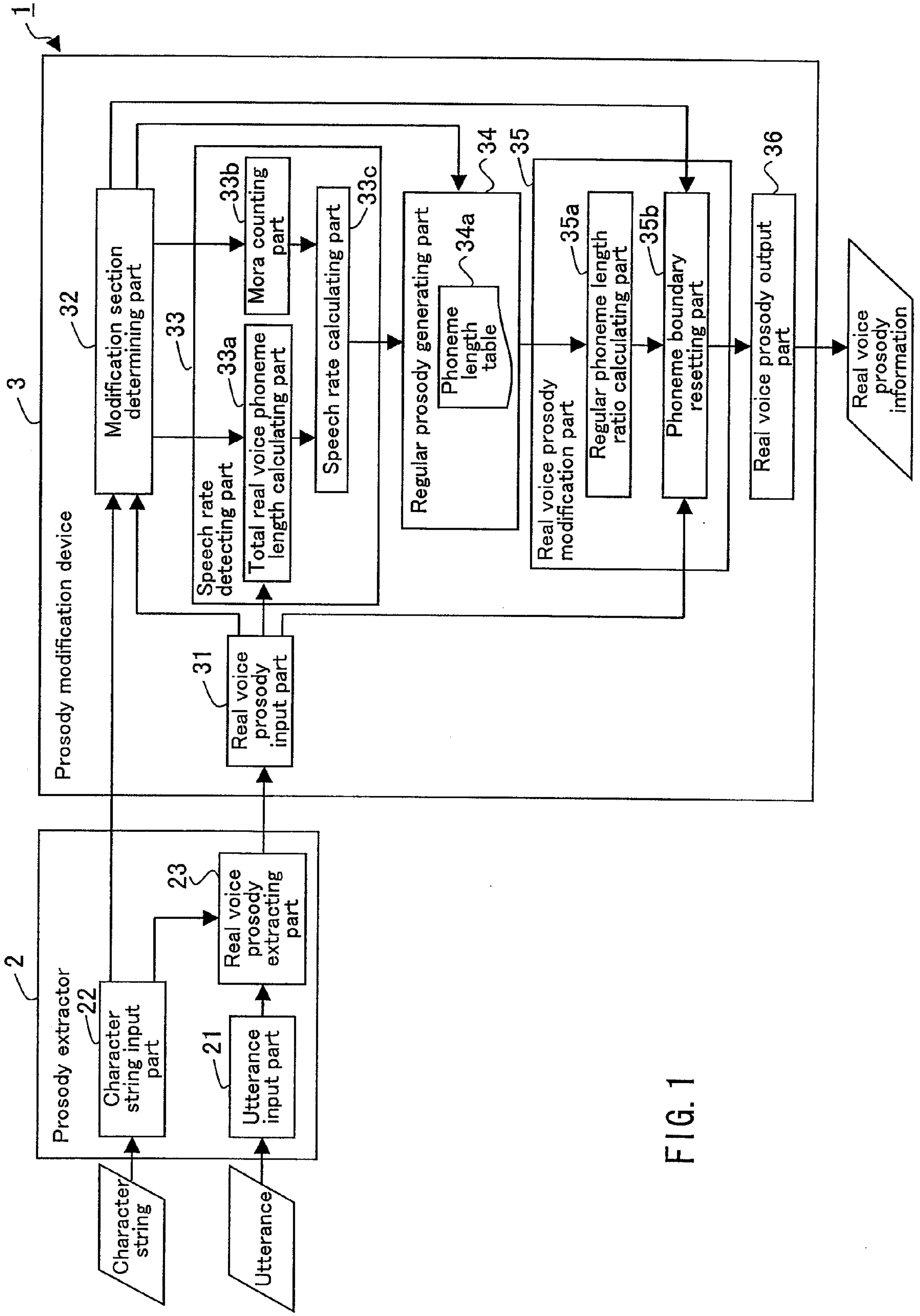
FIG. 1 is a block diagram showing a schematic configuration of a prosody modification system according to Embodiment 1 of the present invention.

FIG. 1 is a block diagram showing a schematic configuration of a prosody modification system 1 according to the present embodiment. The prosody modification system 1 according to the present embodiment includes a prosody extractor 2 and a prosody modification device 3.

Before describing a detailed configuration of the prosody modification device 3, a configuration of the prosody extractor 2 will be described briefly below.

The prosody extractor 2 includes an utterance input part 21, a character string input part 22, and a real voice prosody extracting part 23. The utterance input part 21, the character string input part 22, and the real voice prosody extracting part 23 are embodied also by an operation of a CPU of a computer in accordance with a program for realizing the functions of these parts.

The utterance input part 21 has a function of receiving an utterance of a human, and is constituted by a microphone or an analog-digital converter, for example. In the present embodiment, it is assumed that the utterance input part 21 receives a human utterance of "雨が" ("amega"). The utterance input part 21 converts the received human utterance into digital speech data that can be processed by a computer. The utterance input part 21 outputs the obtained speech data to the real voice prosody extracting part 23. The utterance input part 21 may receive directly digital speech data recorded on a recording medium such as a CD (Compact Disc) and a MD (Mini Disc), digital speech data transmitted via a cable or radio communication network, or the like, as well as analog speech obtained by playing an utterance of a human recorded previously on a recording medium. In the case where the received speech data is compressed, the utterance input part 21 may have a function of decompressing the compressed speech data.

The character string input part 22 has a function of receiving a character string (text) representing a content of the utterance in a real voice received by the utterance input part 21. In the present embodiment, the character string input part 22 receives such a character string that identifies the content of the utterance in a real voice uniquely. For example, the character string is composed of Japanese syllabary characters, square Japanese characters, alphabets, or the like, like "アメガ". The character string input part 22 converts the received character string into character string data expressed in units of phonemes like "AmEgA", for example. The character string input part 22 outputs the obtained character string data to the real voice prosody extracting part 23 and the prosody modification device 3. The character string input part 22 also may receive such a character string that does not identify the content of the utterance uniquely. For example, the character string is composed of a mixture of Chinese characters and Japanese syllabary characters like "雨が". Then, the character string input part 22 may perform a morphogical analysis on the received character string, and convert the character string into character string data expressed in units of phonemes based on a result of the morphogical analysis.

The real voice prosody extracting part 23 extracts real voice prosody information from the speech data output from the utterance input part 21 based on the character string data output from the character string input part 22. Practically, the real voice prosody extracting part 23 extracts the real voice prosody information that determines a manner of speaking such as a voice pitch, an intonation, a rhythm, and the like from the speech data output from the utterance input part 21. In the present embodiment, however, for convenience of explanation, it is assumed that the real voice prosody extracting part 23 extracts the real voice prosody information only about a rhythm. Note here that the rhythm refers to a sequence of phonemes and their phoneme lengths. More specifically, the real voice prosody extracting part 23 sets a phoneme boundary and a phoneme length for each phoneme of the real voice, thereby extracting the real voice prosody information from the speech data. Note here that the phoneme refers to the smallest unit of voice that distinguishes one meaning from another in an arbitrary individual language. The setting of the phoneme boundary for each phoneme may be performed manually by a human confirming a speech waveform, or automatically by using DP matching, HMM, or the like. Here, the setting method is not particularly limited.

Figure 2:
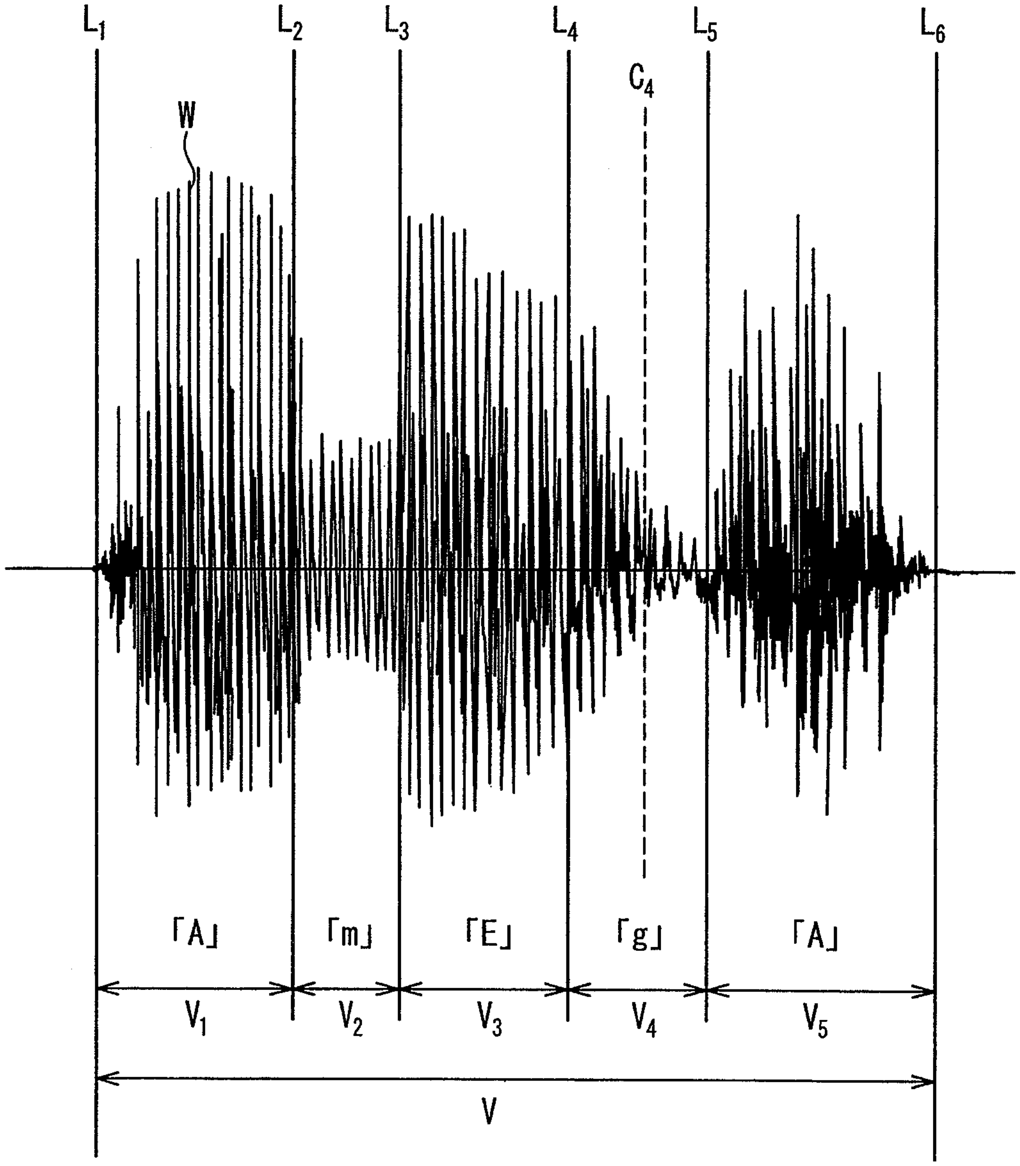
FIG. 2 is a conceptual diagram showing an example of real voice prosody information extracted by a real voice prosody extracting part in the prosody modification system.

FIG. 2 is a conceptual diagram showing an example of the real voice prosody information extracted by the real voice prosody extracting part 23. In the example shown in FIG. 2, the speech data is expressed in the form of a speech waveform W. Each of $L_1$ to $L_6$ denotes a phoneme boundary set for each phoneme of the real voice (hereinafter, referred to as a "real voice phoneme boundary"). A section between $L_1$ and $L_2$ corresponds to a real voice phoneme length $V_1$ of a phoneme of "A". A section between $L_2$ and $L_3$ corresponds to a real voice phoneme length $V_2$ of a phoneme of "m". A section between $L_3$ and $L_4$ corresponds to a real voice phoneme length $V_3$ of a phoneme of "E". A section between $L_4$ and $L_5$ corresponds to a real voice phoneme length $V_4$ of a phoneme of "g". A section between $L_5$ and $L_6$ corresponds to a real voice phoneme length $V_5$ of a phoneme of "A". Namely, the speech data output from the utterance input part 21 is data representing "雨が". V denotes a total real voice phoneme length as a total sum of the respective real voice phoneme lengths $V_1$ to $V_5$.

Here, it is assumed that the real voice phoneme boundary $L_4$ is set erroneously to a great extent due to similar sounds and noises. In other words, it is assumed that the prosody information is extracted erroneously by the real voice prosody extracting part 23. Further, it is assumed that the real voice phoneme boundary $L_4$ should be located at a real voice phoneme boundary $C_4$ correctly in the actual utterance. Since the prosody information is extracted erroneously, the real voice phoneme length $V_3$ of the phoneme of "E" becomes shorter than a real voice phoneme length (section between $L_3$ and $C_4$) of the actual utterance. Further, the real voice phoneme length $V_4$ of the phoneme of "g" becomes longer than a real voice phoneme length (section between $C_4$ and $L_5$) of the actual utterance. Consequently, when synthetic speech is generated by using the real voice prosody information shown in FIG. 2, the synthetic speech has an unnatural rhythm in portions of the phonemes of "E" and "g".

[Configuration of Prosody Modification Device]

The prosody modification device 3 includes a real voice prosody input part 31, a modification section determining part 32, a speech rate detecting part 33, a regular prosody generating part 34, a real voice prosody modification part 35, and a real voice prosody output part 36.

The real voice prosody input part 31 receives the real voice prosody information output from the real voice prosody extracting part 23. The real voice prosody input part 31 outputs the received real voice prosody information to the modification section determining part 32, the speech rate detecting part 33, and the real voice prosody modification part 35.

Based on the character string data output from the character string input part 22 or the real voice prosody information output from the real voice prosody input part 31, the modification section determining part 32 determines a section of the real voice prosody information that is likely to be extracted erroneously in the real voice prosody information extracted from the human utterance, as a modification section of the real voice prosody information to be modified. For example, in the case where the modification section is determined based on the character string data output from the character string input part 22, the modification section determining part 32 determines as the modification section a section from a boundary between a silence or an unvoiced sound and a voiced sound to a boundary between a subsequent voiced sound and a silence or an unvoiced sound. In this manner, when the boundary between a voiced sound and an unvoiced sound, at which the real voice prosody information is less likely to be extracted erroneously, is set as each end of the modification section, the modification can be performed with higher accuracy. In the case where the modification section determining part 32 determines the modification section based on the real voice prosody information, i.e., the modification section is determined based on a phoneme string extracted from the real voice prosody information, the modification section determining part 32 does not have to receive the character string data from the character string input part 22. Thus, in this case, an arrow from the character string input part 22 to the modification section determining part 32 in FIG. 1 is unnecessary.

In the present embodiment, it is assumed that the modification section determining part 32 determines as a modification section a section composed of the five successive phonemes of "A", "m", "E", "g", and "A" based on the character string data of "AmEgA" output from the character string input part 22. Thus, in the present embodiment, the modification section determining part 32 outputs the determined modification section of "AmEgA" to the speech rate detecting part 33, the regular prosody generating part 34, and the real voice prosody modification part 35.

In the above-described example, the modification section determining part 32 determines the whole input phonemes as a modification section. However, the modification section determining part 32 arbitrarily may determine the phonemes of "AmE" representing "雨" as a modification section, for example. Namely, the modification section determining part 32 can determine any number of arbitrary sections of the real voice prosody information that is assumed to be extracted erroneously as modification sections. For example, the modification section determining part 32 can determine as a modification section a section of the real voice prosody information that is likely to be extracted erroneously, such as a section of successive vowels, a section of successive voiced sounds including a contracted sound, and the like. Further, when it is assumed that the real voice prosody information is not extracted erroneously, the modification section determining part 32 does not have to determine the modification section. The modification section determining part 32 may include a modification section specifying part that receives a modification section determined by an administrator of the prosody modification system 1, so that the modification section specifying part can receive the modification section specified by the administrator of the prosody modification system 1.

The speech rate detecting part 33 detects a rate of speech in the modification section output from the modification section determining part 32 in the real voice prosody information output from the real voice prosody input part 31. To this end, the speech rate detecting part 33 includes a total real voice phoneme length calculating part 33*a*, a mora counting part 33*b*, and a speech rate calculating part 33*c*.

The total real voice phoneme length calculating part 33*a* calculates a total real voice phoneme length in the modification section output from the modification section determining part 32 in the real voice prosody information output from the real voice prosody input part 31. In the present embodiment, since the modification section is "AmEgA", the total real voice phoneme length calculating part 33*a* calculates the total real voice phoneme length V, which is the total sum of the respective real voice phoneme lengths $V_1$ to $V_5$. The total real voice phoneme length calculating part 33*a* outputs the calculated total real voice phoneme length to the speech rate calculating part 33*c*.

The mora counting part 33*b* counts the total number of morae included in the modification section output from the modification section determining part 32. In the present embodiment, since the modification section output from the modification section determining part 32 is "AmEgA", the mora counting part 33*b* counts three morae for "a", "me", and "ga" as the total number of morae. Note here that the mora refers to a clause unit of voice having a certain length of time phonologically. The mora counting part 33*b* outputs the counted total number of morae to the speech rate calculating part 33*c*.

The speech rate calculating part 33*c* calculates a rate of speech based on the total real voice phoneme length in the modification section output from the total real voice phoneme length calculating part 33*a* and the total number of morae in the modification section output from the mora counting part 33*b*. More specifically, the speech rate calculating part 33*c* takes a reciprocal of a value obtained by dividing the total real voice phoneme length by the total number of morae, thereby calculating a rate of speech as the number of morae per second. In the present embodiment, the speech rate calculating part 33*c* calculates a rate of speech of 3/V. The speech rate calculating part 33*c* outputs the calculated rate of speech to the regular prosody generating part 34 as speech rate information.

With respect to a section including at least the modification section of "AmEgA" output from the modification section determining part 32, the regular prosody generating part 34 sets a phoneme boundary that determines a boundary between phonemes and a phoneme length by using data representing a regular or statistical phoneme length in a human utterance that corresponds to the same or substantially the same rate of speech as that in the modification section output from the speech rate detecting part 33, thereby generating regular prosody information for the modification section. To this end, the regular prosody generating part 34 includes a phoneme length table 34*a* storing the data representing a regular or statistical phoneme length in a human utterance that is associated with a rate of speech. For example, the phoneme length table 34*a* stores data representing an average phoneme length of a phoneme of "A", data representing an average phoneme length of a phoneme of "I", data representing an average phoneme length of a phoneme of "U", . . . in Japanese phonetic order. Each of these data is associated with a rate of speech, and the phoneme length table 34*a* stores data with respect to a plurality of rates of speech. Instead of the phoneme length table 34*a*, the regular prosody generating part 34 may have a function of generating the data representing a phoneme length in accordance with a rate of speech. The data representing a phoneme length may be obtained by analyzing either a real voice uttered by one human or real voices uttered by a plurality of humans. While the regular prosody information is statistically appropriate prosody information, this information is average data, and thus is less expressive (has a small change in a rhythm) as compared with the real voice prosody information.

Figure 3:
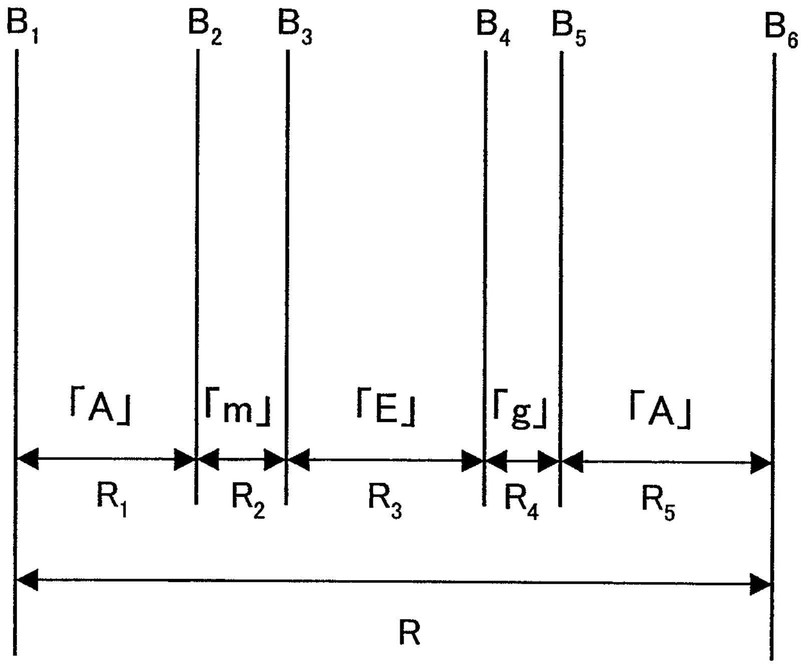
FIG. 3 is a conceptual diagram showing an example of regular prosody information generated by a regular prosody generating part in the prosody modification system.

FIG. 3 is a conceptual diagram showing an example of the regular prosody information generated by the regular prosody generating part 34. Each of $B_1$ to $B_6$ denotes a phoneme boundary set for each phoneme in the modification section (hereinafter, referred to as a "regular phoneme boundary"). A section between $B_1$ and $B_2$ corresponds to a regular phoneme length $R_1$ of the phoneme of "A". A section between $B_2$ and $B_3$ corresponds to a regular phoneme length $R_2$ of the phoneme of "m". A section between $B_3$ and $B_4$ corresponds to a regular phoneme length $R_3$ of the phoneme of "E". A section between $B_4$ and $B_5$ corresponds to a regular phoneme length $R_4$ of the phoneme of "g". A section between $B_5$ and $B_6$ corresponds to a regular phoneme length $R_5$ of the phoneme of "A". R denotes a total regular phoneme length as a total sum of the respective regular phoneme lengths $R_1$ to $R_5$.

In the present embodiment, it is assumed that the regular phoneme length $R_1$ of the phoneme of "A" is "120" msec, the regular phoneme length $R_2$ of the phoneme of "m" is "70" msec, the regular phoneme length $R_3$ of the phoneme of "E"

is "150" msec, the regular phoneme length $R_4$ of the phoneme of "g" is "60" msec, and the regular phoneme length $R_5$ of the phoneme of "A" is "140" msec. The regular prosody generating part 34 outputs the generated regular prosody information to the real voice prosody modification part 35.

The real voice prosody modification part 35 resets the real voice phoneme boundary of the real voice prosody information so that the real voice phoneme boundary of the real voice prosody information in the modification section is approximate to an actual real voice phoneme boundary by using the regular prosody information output from the regular prosody generating part 34, thereby modifying the real voice prosody information. To this end, the real voice prosody modification part 35 includes a regular phoneme length ratio calculating part 35*a* and a phoneme boundary resetting part 35*b*.

The regular phoneme length ratio calculating part 35*a* calculates a ratio of each of the regular phoneme lengths of the regular prosody information output from the regular prosody generating part 34. In the present embodiment, the regular phoneme length ratio calculating part 35*a* initially takes the regular phoneme length $R_1$ of the phoneme of "A", i.e., "120" msec, as a reference regular phoneme length ratio of "1". In this case, the regular phoneme length ratio of the phoneme of "m" is $R_2/R_1$, the regular phoneme length ratio of the phoneme of "E" is $R_3/R_1$, the regular phoneme length ratio of the phoneme of "g" is $R_4/R_1$, and the regular phoneme length ratio of the phoneme of "A" is $R_5/R_1$. In other words, the regular phoneme length ratio calculating part 35*a* calculates the regular phoneme length ratio "1" of the phoneme of "A", the regular phoneme length ratio "0.58" of the phoneme of "m", the regular phoneme length ratio "1.25" of the phoneme of "E", the regular phoneme length ratio "0.5" of the phoneme of "g", and the regular phoneme length ratio "1.17" of the phoneme of "A". In the present embodiment, each of the regular phoneme length ratios is calculated to two decimal places. Consequently, the ratios of the respective regular phoneme lengths of the regular prosody information are "1:0.58:1.25:0.5:1.17". The regular phoneme length ratio calculating part 35*a* outputs the calculated ratios of the respective regular phoneme lengths to the phoneme boundary resetting part 35*b*.

The phoneme boundary resetting part 35*b* resets the real voice phoneme boundary of the real voice prosody information so that the total sum of the respective real voice phoneme lengths in the modification section is bounded in accordance with the ratios of the respective regular phoneme lengths in the modification section, thereby modifying the real voice prosody information. In the present embodiment, since the modification section ranges over the five phonemes of "A", "m", "E", "g", and "A", the phoneme boundary resetting part 35*b* divides the total real voice phoneme length V in accordance with the ratios of the respective regular phoneme lengths, "1:0.58:1.25:0.5:1.17", so as to reset the real voice phoneme boundaries $L_2$ to $L_5$, thereby modifying the real voice prosody information. Further, it is also possible to obtain a final phoneme length of each of the phonemes by obtaining an arbitrarily weighted average of the modified phoneme length obtained as a result of the division at the ratio of the regular phoneme length and the unmodified phoneme length output from the real voice prosody input part 31. The modified phoneme length may be weighted more in order to ensure higher stability, or alternatively, the unmodified phoneme length may be weighted more in order to ensure a rhythm of an actual utterance. In this manner, a desired modification result can be obtained.

Figure 4:
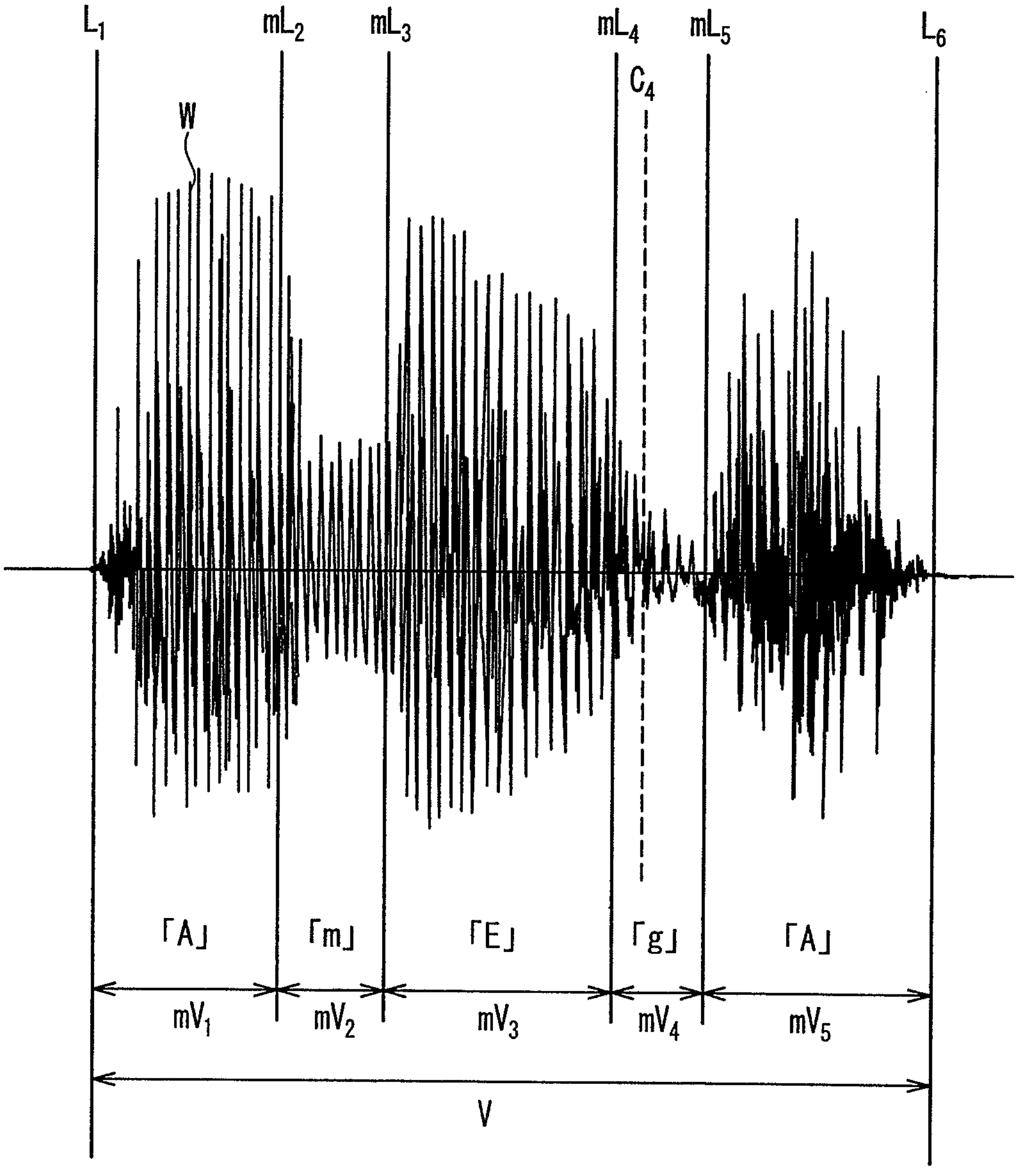
FIG. 4 is a conceptual diagram showing an example of real voice prosody information modified by a phoneme boundary resetting part in the prosody modification system.

FIG. 4 is a conceptual diagram showing an example of the real voice prosody information modified by the phoneme boundary resetting part 35*b*. Each of $mL_2$ to $mL_5$ denotes the reset real voice phoneme boundary. A section between $L_1$ and $mL_2$ corresponds to a modified real voice phoneme length $mV_1$ of the phoneme of "A". A section between $mL_2$ and $mL_3$ corresponds to a modified real voice phoneme length $mV_2$ of the phoneme of "m". A section between $mL_3$ and $mL_4$ corresponds to a modified real voice phoneme length $mV_3$ of the phoneme of "E". A section between $mL_4$ and $mL_5$ corresponds to a modified real voice phoneme length $mV_4$ of the phoneme of "g". A section between $mL_5$ and $L_6$ corresponds to a modified real voice phoneme length $mV_5$ of the phoneme of "A". The real voice phoneme boundary $mL_4$ shown in FIG. 4 is approximate to the actual real voice phoneme boundary $C_4$ as compared with the real voice phoneme boundary $L_4$ shown in FIG. 2. This is because the modified real voice prosody information comprehensively is based on the total sum of the respective real voice phoneme lengths in the modification section, and locally adopts the regularly or statistically appropriate regular prosody information. The phoneme boundary resetting part 35*b* outputs the modified real voice prosody information to the real voice prosody output part 36.

The real voice prosody output part 36 outputs the real voice prosody information output from the phoneme boundary resetting part 35*b* to the outside of the real voice prosody modification device 3. The real voice prosody information output from the real voice prosody output part 36 is used by a speech synthesizer to generate and output synthetic speech, for example. Since the real voice prosody information output from the real voice prosody output part 36 has its error in extraction corrected, the synthetic speech generated by using the real voice prosody information output from the real voice prosody output part 36 is as natural and expressive as human speech. The real voice prosody information output from the real voice prosody output part 36 may be used by a prosody dictionary organizing device to organize a prosody dictionary for speech synthesis, instead of or in addition to being used by a speech synthesizer to generate synthetic speech. Further, the real voice prosody information may be used by a waveform dictionary organizing device to organize a waveform dictionary for speech synthesis. Furthermore, the real voice prosody information may be used by an acoustic model generating device to generate an acoustic model for speech recognition. Namely, there is no particular limitation on how to use the real voice prosody information output from the real voice prosody output part 36.

Now, the prosody modification device 3 is realized also by installing a program on an arbitrary computer such as a personal computer. In other words, the real voice prosody input part 31, the modification section determining part 32, the speech rate detecting part 33, the regular prosody generating part 34, the real voice prosody modification part 35, and the real voice prosody output part 36 are embodied by an operation of a CPU of a computer in accordance with a program for realizing the functions of these parts. On this account, the program for realizing the functions of the real voice prosody input part 31, the modification section determining part 32, the speech rate detecting part 33, the regular prosody generating part 34, the real voice prosody modification part 35, and the real voice prosody output part 36 or a recording medium storing this program is also an embodiment of the present invention.

The configuration of the prosody modification system 1 is not limited to the above-described configuration shown in FIG. 1. For example, it is also possible to provide a prosody modification system 1*a* (see FIG. 5) including a speech rate ratio detecting part 37 and a real voice prosody modification part 38 instead of the speech rate detecting part 33 and the real voice prosody modification part 35 in the prosody modification device 3. Further, it is also possible to provide a prosody modification system 1*b* (see FIG. 6) including a speech recognition part 24 instead of the character string input part 22 in the prosody extractor 2.

Figure 5:
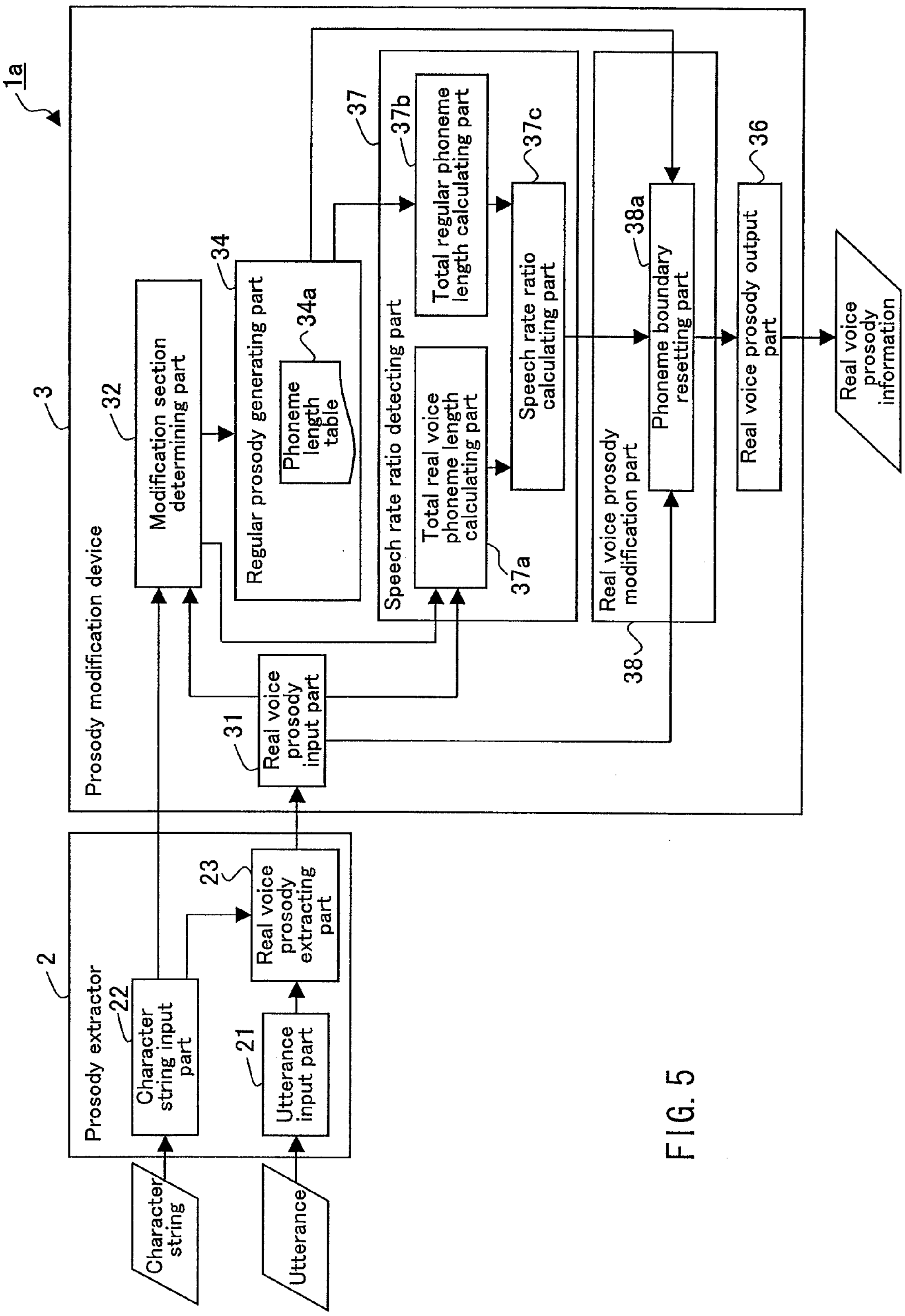
FIG. 5 is a block diagram showing a schematic configuration in a modified example of the prosody modification system.

FIG. 5 is a block diagram showing a schematic configuration of the prosody modification system 1*a* including the speech rate ratio detecting part 37 and the real voice prosody modification part 38 in the prosody modification device 3 instead of the speech rate detecting part 33 and the real voice prosody modification part 35 shown in FIG. 1. In FIG. 5, the components having the same functions as those of the components in FIG. 1 are denoted with the same reference numerals. The speech rate ratio detecting part 37 includes a total real voice phoneme length calculating part 37*a*, a total regular phoneme length calculating part 37*b*, and a speech rate ratio calculating part 37*c*. Since the prosody modification device 3 shown in FIG. 5 does not include the speech rate detecting part 33 shown in FIG. 1, the regular prosody generating part 34 does not receive the speech rate information. Thus, the regular prosody generating part 34 shown in FIG. 5 only has to generate regular prosody information corresponding to an arbitrary rate of speech. Most preferably, however, the regular prosody generating part 34 may generate regular prosody information by using phoneme length data corresponding to an average rate of human speech in various situations.

The total real voice phoneme length calculating part 37*a* calculates the total sum of the respective real voice phoneme lengths of the real voice prosody information in the modification section. Here, the total real voice phoneme length calculating part 37*a* calculates the total real voice phoneme length V, which is the total sum of the respective real voice phoneme lengths $V_1$ to $V_5$ (see FIG. 2). The total regular phoneme length calculating part 37*b* calculates the total sum of the respective regular phoneme lengths of the regular prosody information in the modification section. Here, the total regular phoneme length calculating part 37*b* calculates the total regular phoneme length R, which is the total sum of the respective regular phoneme lengths $R_1$ to $R_5$ (see FIG. 3). The speech rate ratio calculating part 37*c* calculates as a speech rate ratio a reciprocal of a ratio of the total sum of the real voice phoneme lengths calculated by the total real voice phoneme length calculating part 37*a* to the total sum of the regular phoneme lengths calculated by the total regular phoneme length calculating part 37*b*. Here, the speech rate ratio calculating part 37*c* calculates a speech rate ratio H of R/V.

The real voice prosody modification part 38 includes a phoneme boundary resetting part 38*a*. The phoneme boundary resetting part 38*a* resets the real voice phoneme boundaries $L_2$ to $L_6$ so that respective real voice phoneme lengths in the modification section become respective phoneme lengths $R_1/H$, $R_2/H$, . . . $R_5/H$, which are obtained by multiplying the respective regular phoneme lengths $R_1$ to $R_5$ in the modification section by 1/H as a reciprocal of the speech rate ratio H calculated by the speech rate ratio calculating part 37*c*, thereby modifying the real voice prosody information. As a result, the real voice prosody information modified by the phoneme boundary resetting part 38*a* is as shown in FIG. 4 like the real voice prosody information modified by the phoneme boundary resetting part 35*b* shown in FIG. 1. In other words, although the speech rate ratio detecting part 37 and the real voice prosody modification part 38 modify the real voice prosody information in a manner different from that of the real voice prosody modification part 35, the same modification result can be obtained.

In the prosody modification system 1*a* shown in FIG. 5, the speech rate detecting part 33 shown in FIG. 1 may be provided between the modification section determining part 32 and the regular prosody generating part 34, so that the regular prosody generating part 34 can generate regular prosody information corresponding to the same or substantially the same rate of speech as that of the real voice prosody information and output the generated regular prosody information to the speech rate ratio detecting part 37.

Figure 6:
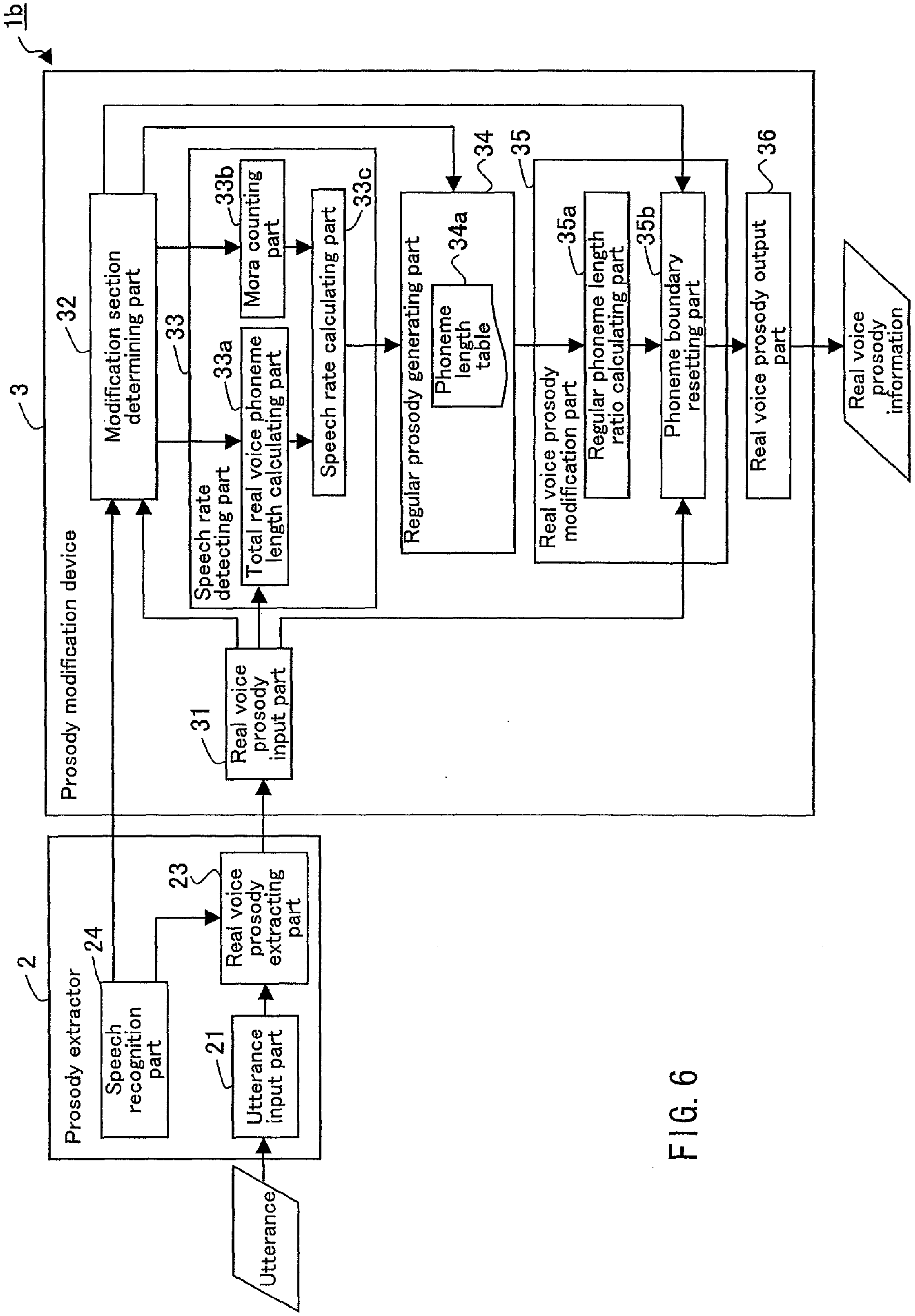
FIG. 6 is a block diagram showing a schematic configuration in a modified example of the prosody modification system.

FIG. 6 is a block diagram showing a schematic configuration of the prosody modification system 1*b* including the speech recognition part 24 in the prosody extractor 2. In FIG. 6, the components having the same functions as those of the components in FIG. 1 are denoted with the same reference numerals. The speech recognition part 24 has a function of recognizing a content of an utterance. To this end, the speech recognition part 24 initially converts the speech data output from the utterance input part 21 into a feature value. With the use of the obtained feature value, the speech recognition part 24 outputs as a recognition result the most probable vocabulary or character string for representing the content of the input real voice with reference to information on an acoustic model and a language model (both not shown). The speech recognition part 24 outputs the recognition result to the real voice prosody extracting part 23 and the prosody modification device 3.

As described above, even when the prosody modification system 1*b* does not include the character string input part 22 that receives the character string of "雨が" representing the content of the utterance in a real voice as provided in the prosody modification system 1 shown in FIG. 1, the speech recognition part 24 can recognize the content of the utterance and output the recognition result representing "雨が" to the real voice prosody extracting part 23 and the prosody modification device 3.

[Operation of Prosody Modification Device]

Next, an operation of the prosody modification device 3 with the above-described configuration will be described with reference to FIG. 7.

Figure 7:
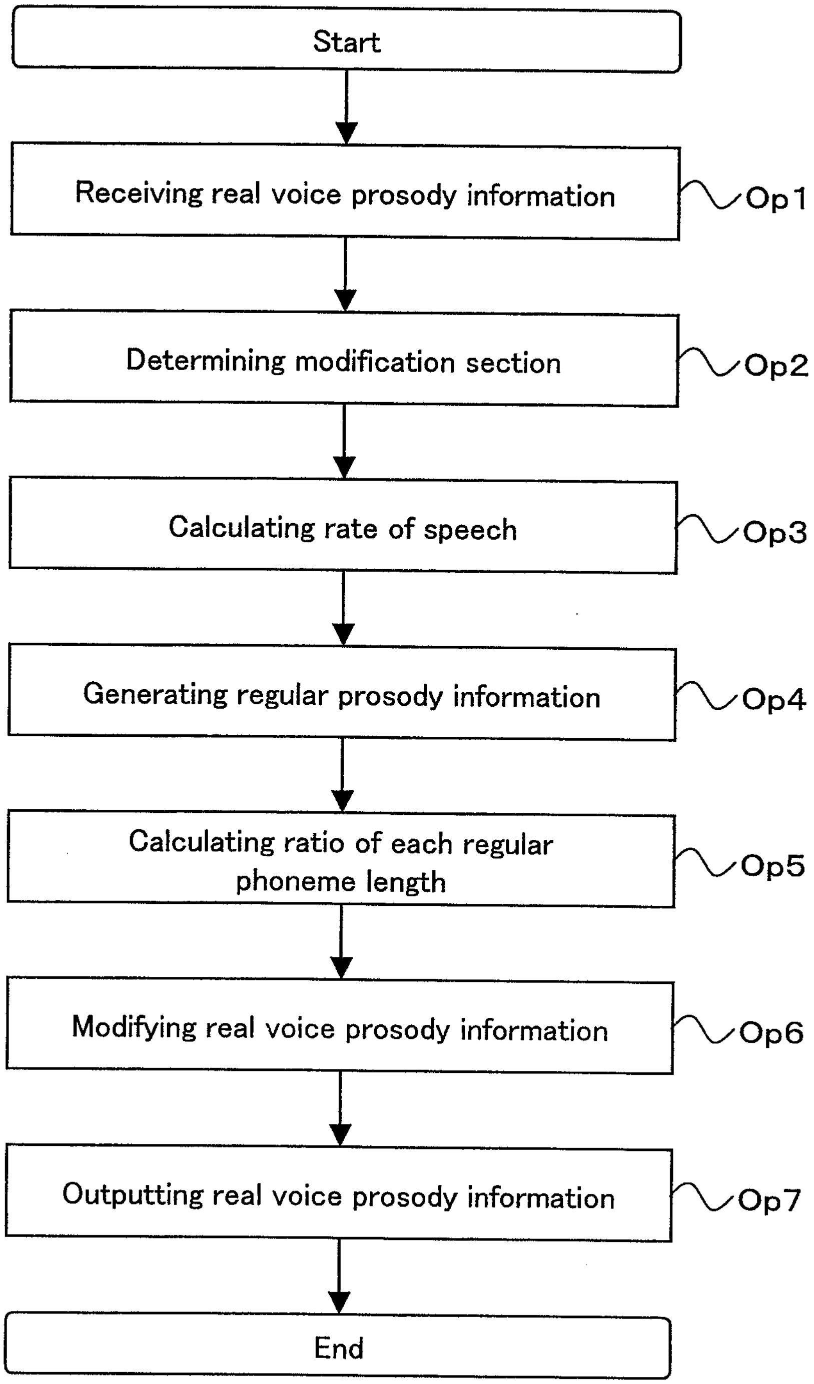
FIG. 7 is a flow chart showing an example of an operation of a prosody modification device in the prosody modification system.

FIG. 7 is a flow chart showing an example of the operation of the prosody modification device 3. As shown in FIG. 7, the real voice prosody input part 31 receives the real voice prosody information output from the real voice prosody extracting part 23 (Op 1).

Then, based on the character string data output from the character string input part 22 or the real voice prosody information received in Op 1, the modification section determining part 32 determines a section of the real voice prosody information that is likely to be extracted erroneously in the real voice prosody information extracted from the human utterance, as a modification section of the real voice prosody information to be modified (Op 2). The speech rate detecting part 33 calculates a rate of speech in the modification section determined in Op 2 in the real voice prosody information received in Op 1 (Op 3).

Thereafter, the regular prosody generating part 34 sets the regular phoneme boundary that determines a boundary between phonemes by using the data representing a regular or statistical phoneme length in a human real voice that corresponds to the same or substantially the same rate of speech as that calculated in Op 3, thereby generating the regular prosody information (Op 4).

After that, the regular phoneme length ratio calculating part 35*a* calculates the ratios of the respective regular phoneme lengths of the regular prosody information generated in Op 4 (Op 5). The phoneme boundary resetting part 35*b* resets the real voice phoneme boundary of the real voice prosody information so that the total sum of the respective real voice phoneme lengths in the modification section is bounded in accordance with the ratios of the respective regular phoneme lengths calculated in Op 5, thereby modifying the real voice prosody information (Op 6). The real voice prosody output part 36 outputs the real voice prosody information modified in Op 6 to the outside of the real voice prosody modification device 3 (Op 7).

As described above, according to the prosody modification device 3 of the present embodiment, in the section of a phoneme or a phoneme string to be modified, the phoneme boundary resetting part 35*b* resets the real voice phoneme boundary of a phoneme or a phoneme string to be modified in the real voice prosody information based on the regular phoneme length of each phoneme of the regular prosody information and the speech rate ratio as a ratio between the rate of speech of the real voice prosody information and the rate of speech of the regular prosody information, thereby modifying the real voice prosody information. In other words, the modified real voice prosody information comprehensively is based on the total sum of the respective real voice phoneme lengths in the modification section, and locally has its real voice phoneme boundary reset in accordance with the ratios of the statistically appropriate regular phoneme lengths. As a result, it is possible to modify the real voice prosody information extracted erroneously from a human utterance without impairment of the naturalness and expressiveness of a human real voice and without time and trouble.

Figure 8A:
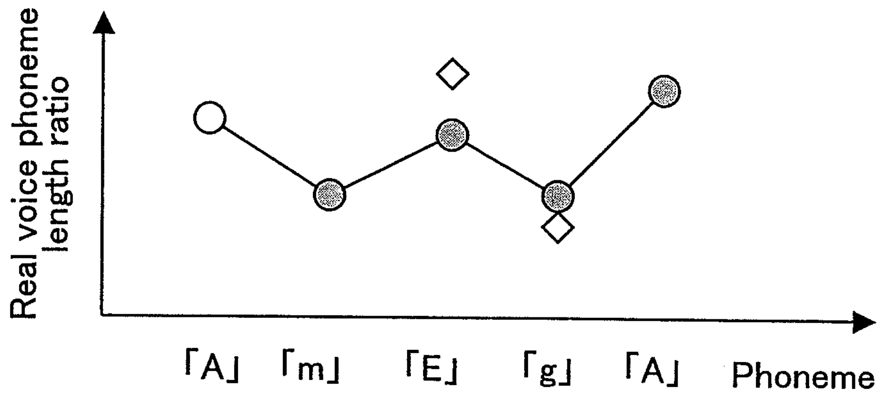
FIGS. 8A, 8B and 8C are graphs for explaining the relationship between each phoneme and a phoneme length ratio of the phoneme.

Hereinafter, the operation of the prosody modification device 3 according to the present embodiment will be described by way of a specific example with reference to FIGS. 8A to 8C. FIG. 8A is a graph for explaining the relationship between each of the phonemes of the real voice prosody information shown in FIG. 2 and a real voice phoneme length ratio of each of the phonemes. Namely, marks ○ shown in FIG. 8A represent the real voice phoneme length ratios of the phonemes of “A”, “m”, “E”, “g”, and “A”, respectively, to the beginning phoneme of “A” in the real voice prosody information extracted by the real voice prosody extracting part 23. Specifically, with the real voice phoneme length $V_1$ of the phoneme of “A” being a reference real voice phoneme length ratio of “1”, the real voice phoneme length ratio of the phoneme of “m” is $V_2/V_1$, the real voice phoneme length ratio of the phoneme of “E” is $V_3/V_1$, the real voice phoneme length ratio of the phoneme of “g” is $V_4/V_1$, and the real voice phoneme length ratio of the phoneme of “A” is $V_5/V_1$. Marks ◇ shown in FIG. 8A represent real voice phoneme length ratios of the phonemes of “E” and “g” in the case where the real voice phoneme boundary $L_4$ shown in FIG. 2 is located at the actual real voice phoneme boundary $C_4$.

Figure 8B:
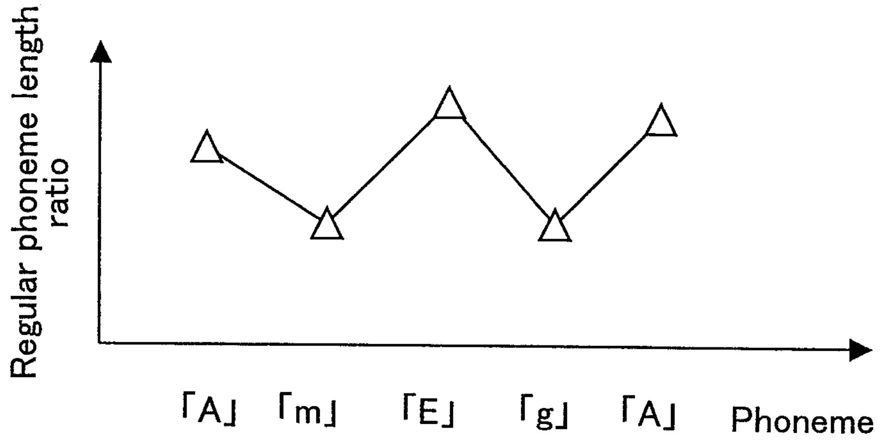

FIG. 8B is a graph for explaining the relationship between each of the phonemes of the regular prosody information shown in FIG. 3 and the regular phoneme length ratio of each of the phonemes. Namely, marks Δ shown in FIG. 8B represent the regular phoneme length ratios of the phonemes of “A”, “m”, “E”, “g”, and “A”, respectively, to the beginning phoneme of “A” in the regular prosody information generated by the regular prosody generating part 34. The regular phoneme length ratios of the respective phonemes are “1:0.58:1.25:0.5:1.17” as described above.

Figure 8C:
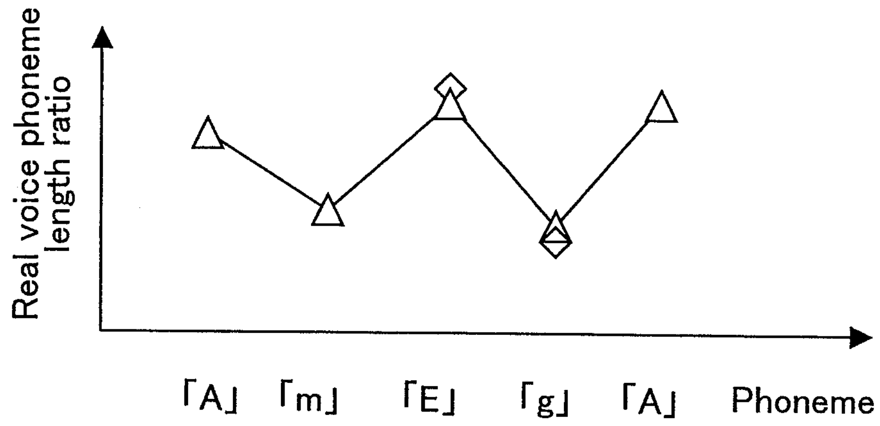

FIG. 8C is a graph for explaining the relationship between each of the phonemes of the real voice prosody information shown in FIG. 4 and a real voice phoneme length ratio of each of the phonemes. Namely, marks Δ shown in FIG. 8C represent the real voice phoneme length ratios of the phonemes of “A”, “m”, “E”, “g”, and “A”, respectively, of the real voice prosody information modified by the phoneme boundary resetting part 35*b*. As shown in FIG. 8C, the real voice phoneme length ratios of the phonemes of “E” and “g” are close to the actual real voice phoneme length ratios of the phonemes of “E” and “g” represented by marks 0 in FIG. 8C. This is because the modified real voice prosody information comprehensively is based on the total sum of the respective real voice phoneme lengths in the modification section, and locally adopts the statistically appropriate regular prosody information.

[Embodiment 2]

Figure 9:
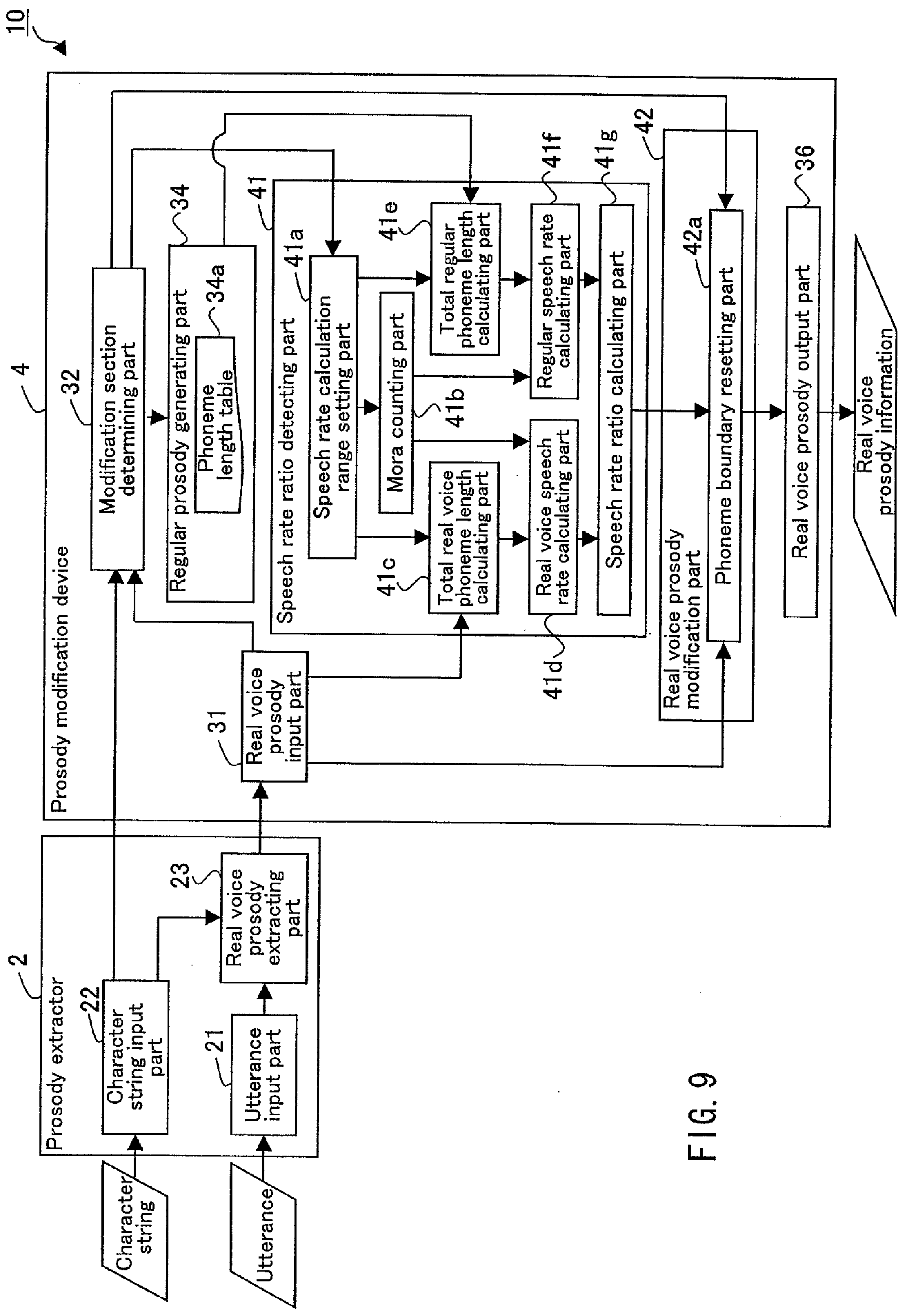
FIG. 9 is a block diagram showing a schematic configuration of a prosody modification system according to Embodiment 2 of the present invention.

FIG. 9 is a block diagram showing a schematic configuration of a prosody modification system 10 according to the present embodiment. The prosody modification system 10 according to the present embodiment includes a prosody modification device 4 instead of the prosody modification device 3 shown in FIG. 1. In FIG. 9, the components having the same functions as those of the components in FIG. 1 are denoted with the same reference numerals, and detailed descriptions thereof will be omitted.

[Configuration of Prosody Modification Device]

The prosody modification device 4 includes a speech rate ratio detecting part 41 and a real voice prosody modification part 42 instead of the speech rate detecting part 33 and the real voice prosody modification part 35 shown in FIG. 1. The speech rate ratio detecting part 41 and the real voice prosody modification part 42 are embodied also by an operation of a CPU of a computer in accordance with a program for realizing the functions of these parts.

The speech rate ratio detecting part 41 includes a speech rate calculation range setting part 41*a*, a mora counting part 41*b*, a total real voice phoneme length calculating part 41*c*, a real voice speech rate calculating part 41*d*, a total regular phoneme length calculating part 41*e*, a regular speech rate calculating part 41*f*, and a speech rate ratio calculating part 41*g*.

With respect to each phoneme in the modification section output from the modification section determining part 32, the speech rate calculation range setting part 41*a* sets a speech rate calculation range composed of at least one or more phonemes or morae including a phoneme to be modified. In the present embodiment, the speech rate calculation range setting part 41*a* sets speech rate calculation ranges K[1], K[2], K[3], K[4], and K[5] for the phonemes of “A”, “m”, “E”, “g”, and “A”, respectively, in the modification section. Here, it is assumed that the speech rate calculation range setting part 41*a* sets a speech rate calculation range of three morae including two morae adjacent to the mora including a phoneme to be modified with respect to each of the phonemes in the modification section. However, the speech rate calculation range setting part 41*a* sets a speech rate calculation range of two morae adjacent to the mora including a phoneme to be modified with respect to each of the phonemes of morae located at breath boundary in the modification section. More specifically, in the case where the second phoneme “m” in the modification section of “AmEgA” is to be modified, the speech rate calculation range setting part 41*a* sets the speech rate calculation range K[2] composed of the five phonemes of “A”, “m”, “E”, “g”, and “A” with three morae. The speech rate calculation range setting part 41*a* outputs the set speech rate calculation range K[n] (n is an integer of 1 or more) to the mora counting part 41*b*, the total real voice phoneme length calculating part 41*c*, and the total regular phoneme length calculating part 41*e*.

Preferably, the speech rate calculation range setting part 41*a* dynamically changes the setting of the speech rate calculation range in accordance with the environment of a phoneme. For example, the speech rate calculation range setting part 41*a* sets the speech rate calculation range to be broader with respect to a phoneme in a section of the real voice prosody information that is likely to be extracted erroneously, such as a section of successive voiced vowels, and sets the speech rate calculation range to be narrower with respect to a phoneme in a section of the real voice prosody information that is less likely to be extracted erroneously, such as a section including many boundaries between a voiced sound and an unvoiced sound. As a result, it becomes possible to calculate a rate of speech with higher importance being placed on a real voice with respect to a portion where the real voice prosody information is less likely to be extracted erroneously, and to calculate a more stable rate of speech with respect to a portion where the real voice prosody information is likely to be extracted erroneously. Therefore, it becomes possible to calculate a rate of speech that is close to a rhythm of a real voice and is stable as a whole.

The mora counting part 41*b* counts the total number of morae in the speech rate calculation range output from the speech rate calculation range setting part 41*a*. In the present embodiment, since the speech rate calculation range is set to be three morae including two morae adjacent to the mora including the phoneme to be modified, the mora counting part 41*b* counts the total number of morae as three. However, the mora counting part 41*b* counts the total number of morae as two, when the mora including a phoneme to be modified is located at breath boundary. The mora counting part 41*b* outputs the counted total number of morae to the real voice speech rate calculating part 41*d* and the regular speech rate calculating part 41*f*.

The total real voice phoneme length calculating part 41*c* calculates a total real voice phoneme length in the speech rate calculation range output from the speech rate calculation range setting part 41*a* in the real voice prosody information output from the real voice prosody input part 31. In the present embodiment, the total real voice phoneme length calculating part 41*c* calculates total real voice phoneme lengths V[1], V[2], V[3], V[4], and V[5] for the speech rate calculation ranges K[1], K[2], K[3], K[4], and K[5], respectively. For example, in the case where the speech rate calculation range is K[2], the total real voice phoneme length calculating part 41*c* calculates the total real voice phoneme length V, which is the total sum of the respective real voice phoneme lengths $V_1$ to $V_5$ as V[2] (see FIG. 2). The total real voice phoneme length calculating part 41*c* outputs the calculated total real voice phoneme length V[n] to the real voice speech rate calculating part 41*d*.

The real voice speech rate calculating part 41*d* calculates a rate of speech $S_V$ for a phoneme to be modified in the modification section in the real voice prosody information as the number of morae uttered per second. More specifically, the real voice speech rate calculating part 41*d* takes a reciprocal of a value obtained by dividing the total real voice phoneme length output from the total real voice phoneme length calculating part 41*c* by the total number of morae output from the mora counting part 41*b*, thereby calculating the rate of speech $S_V$ of the real voice prosody information. In the present embodiment, the real voice speech rate calculating part 41*d* calculates rates of speech $S_V$[1], $S_V$[2], $S_V$[3], $S_V$[4], and $S_V$[5] for the total real voice phoneme lengths V[1], V[2], V[3], V[4], and V[5], respectively. For example, in the case where the total real voice phoneme length is V[2], the real voice speech rate calculating part 41*d* calculates the rate of speech $S_V$[2] as 3/V[2]. The real voice speech rate calculating part 41*d* outputs the calculated rate of speech $S_V$[n] to the speech rate ratio calculating part 41*g*.

The total regular phoneme length calculating part 41*e* calculates a total regular phoneme length in the speech rate calculation range output from the speech rate calculation range setting part 41*a* in the regular prosody information output from the regular prosody generating part 34. In the present embodiment, the total regular phoneme length calculating part 41*e* calculates total regular phoneme lengths R[1], R[2], R[3], R[4], and R[5] for the speech rate calculation ranges K[1], K[2], K[3], K[4], and K[5], respectively. For example, in the case where the speech rate calculation range is K[2], the total regular phoneme length calculating part 41*e* calculates the total regular phoneme length R, which is the total sum of the respective regular phoneme lengths $R_1$ to $R_5$ as R[2] (see FIG. 3). The total regular phoneme length calculating part 41*e* outputs the calculated total regular phoneme length R[n] to the regular speech rate calculating part 41*f*.

The regular speech rate calculating part 41*f* calculates a rate of speech $S_R$ for a phoneme to be modified in the modification section in the regular prosody information as the number of morae uttered per second. More specifically, the regular speech rate calculating part 41*f* takes a reciprocal of a value obtained by dividing the total regular phoneme length output from the total regular phoneme length calculating part 41*e* by the total number of morae output from the mora counting part 41*b*, thereby calculating the rate of speech $S_R$ of the regular prosody information. In the present embodiment, the regular speech rate calculating part 41*f* calculates rates of speech $S_R$[1], $S_R$[2], $S_R$[3], $S_R$[4], and $S_R$[5] for the total regular phoneme lengths R[1], R[2], R[3], R[4], and R[5], respectively. For example, in the case where the total regular phoneme length is R[2], the regular speech rate calculating part 41*f* calculates the rate of speech $S_R$[2] as 3/R[2]. The regular speech rate calculating part 41*f* outputs the calculated rate of speech $S_R$[n] to the speech rate ratio calculating part 41*g*.

The speech rate ratio calculating part 41*g* calculates a ratio between the rate of speech $S_R$[n] output from the regular speech rate calculating part 41*f* and the rate of speech $S_V$[n] output from the real voice speech rate calculating part 41*d* as a speech rate ratio H'[n]. More specifically, the speech rate ratio calculating part 41*g* calculates the ratio of the rate of speech $S_V$[n] to the rate of speech $S_R$[n] as the speech rate ratio H'[n]. In other words, the speech rate ratio H'[n] is $S_V$[n]/$S_R$[n]. In the present embodiment, the speech rate ratio calculating part 41*g* calculates a speech rate ratio H'[1] of $S_V$[1]/$S_R$[1], a speech rate ratio H'[2] of $S_V$[2]/$S_R$[2], a speech rate ratio H'[3] of $S_V$[3]/$S_R$[3], a speech rate ratio H'[4] of $S_V$[4]/$S_R$[4], and a speech rate ratio H'[5] of $S_V$[5]/$S_R$[5]. The speech rate ratio calculating part 41*g* outputs the calculated speech rate ratio H'[n] to the real voice prosody modification part 42.

The real voice prosody modification part 42 includes a phoneme boundary resetting part 42*a*. The phoneme boundary resetting part 42*a* resets the real voice phoneme boundary of the real voice prosody information so that each real voice phoneme length in the modification section becomes each phoneme length obtained by multiplying each of the regular phoneme lengths in the modification section by a reciprocal of the speech rate ratio H'[n] output from the speech rate ratio detecting part 41, thereby modifying the real voice prosody information. In the present embodiment, the phoneme boundary resetting part 42*a* initially multiplies the respective regular phoneme lengths $R_1$ to $R_5$ shown in FIG. 3 by the speech rate ratios H'[1] to H'[5], respectively, output from the speech rate ratio detecting part 41. In other words, the phoneme length of the phoneme of "A" is $R_1$/H'[1], the phoneme length of the phoneme of "m" is $R_2$/H'[2], the phoneme length of the phoneme of "E" is $R_3$/H'[3], the phoneme length of the phoneme of "g" is $R_4$/H'[4], and the phoneme length of the phoneme of "A" is $R_5$/H'[5]. The phoneme boundary resetting part 42*a* resets the real voice phoneme boundaries $L_2$ to $L_6$ so that the respective real voice phoneme lengths $V_1$ to $V_5$ in the modification section become the phoneme lengths $R_1$/H'[1] to $R_5$/H'[5], respectively, calculated as described above, thereby modifying the real voice prosody information. As a result, the prosody information extracted erroneously by the real voice prosody extracting part 23 is modified. This is because the real voice prosody information is modified to be close to a rhythm of a real voice as a whole while its local prosodic disorder is modified, since the speech rate ratio H' for achieving a rhythm close to that of a real voice is applied to the statistically appropriate regular prosody information. The phoneme boundary resetting part 42*a* outputs the modified real voice prosody information to the real voice prosody output part 36.

The phoneme boundary resetting part 42*a* may obtain a final phoneme length of each of the phonemes by obtaining an arbitrarily weighted average of the phoneme length $R_n$/H'[n] modified by using the speech rate ratio H' and the unmodified phoneme length output from the real voice prosody input part 31. The modified phoneme length may be weighted more in order to ensure higher stability, or alternatively, the unmodified phoneme length may be weighted more in order to ensure a rhythm of an actual utterance. In this manner, a desired modification result can be obtained.

[Operation of Prosody Modification Device]

Figure 10:
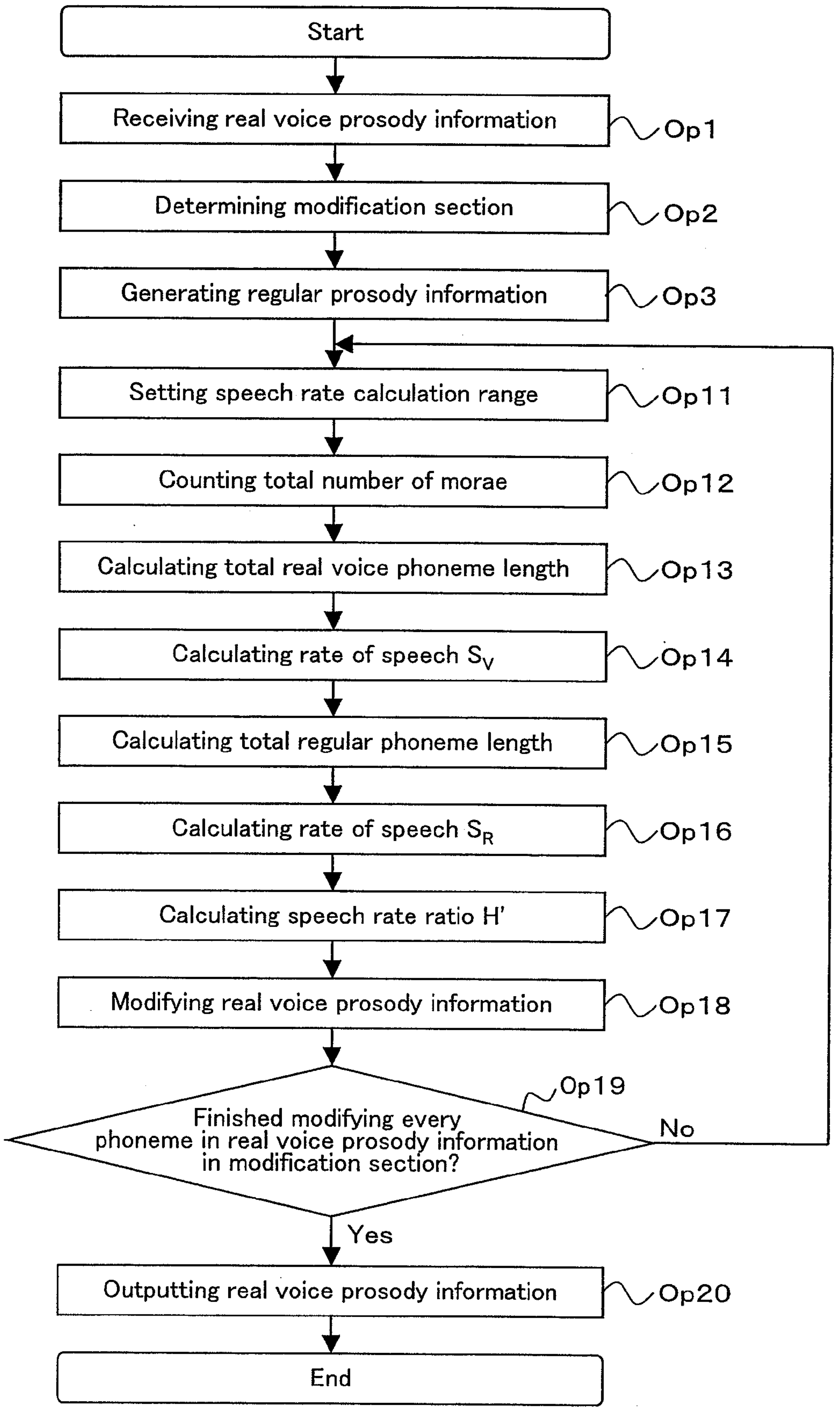
FIG. 10 is a flow chart showing an example of an operation of a prosody modification device in the prosody modification system.

Next, an operation of the prosody modification device 4 with the above-described configuration will be described with reference to FIG. 10. In FIG. 10, the parts showing the same processes as those in FIG. 7 are denoted with the same reference numerals, and detailed descriptions thereof will be omitted.

FIG. 10 is a flow chart showing an example of the operation of the prosody modification device 4. The operations in Op 1 and Op 2 shown in FIG. 10 are the same as those in Op 1 and Op 2 shown in FIG. 7. In Op 3 shown in FIG. 10, almost the same operation as that in Op 4 shown in FIG. 7 is performed except that the regular prosody generating part 34 does not receive the speech rate information. Thus, in Op 3 shown in FIG. 10, the regular prosody generating part 34 generates regular prosody information corresponding to an arbitrary rate of speech.

After Op 3, the speech rate calculation range setting part 41*a* sets the speech rate calculation range composed of at least one or more phonemes or morae including a phoneme to be modified with respect to each phoneme in the modification section determined in Op 2 (Op 11). The mora counting part 41*b* counts the total number of morae included in the speech rate calculation range set in Op 11 (Op 12).

Then, the total real voice phoneme length calculating part 41*c* calculates the total real voice phoneme length in the speech rate calculation range set in Op 11 in the real voice prosody information output from the real voice prosody input part 31 (Op 13). The real voice speech rate calculating part 41*d* takes a reciprocal of a value obtained by dividing the total real voice phoneme length calculated in Op 13 by the total number of morae calculated in Op 12, thereby calculating the rate of speech $S_V$ of the real voice prosody information (Op 14).

Thereafter, the total regular phoneme length calculating part 41*e* calculates the total regular phoneme length in the speech rate calculation range set in Op 11 in the regular prosody information generated in Op 3 (Op 15). The regular speech rate calculating part 41*f* takes a reciprocal of a value obtained by dividing the total regular phoneme length calculated in Op 15 by the total number of morae calculated in Op 12, thereby calculating the rate of speech $S_R$ of the regular prosody information by (Op 16).

After that, the speech rate ratio calculating part 41*g* calculates the ratio of the rate of speech $S_V$ calculated in Op 14 to the rate of speech $S_R$ calculated in Op 16 as the speech rate ratio H' (Op 17). The phoneme boundary resetting part 42*a* resets the real voice phoneme boundary of the real voice prosody information so that each real voice phoneme length in the modification section becomes each phoneme length obtained by multiplying each of the regular phoneme lengths in the modification section by a reciprocal of the speech rate ratio H' calculated in Op 17, thereby modifying the real voice prosody information (Op 18).

Then, when the phoneme boundary resetting part 42*a* finishes the modification for all the phonemes in the real voice prosody information in the modification section (Yes in Op 19), the real voice prosody output part 36 outputs the real voice prosody information modified in Op 18 to the outside of the prosody modification device 4 (Op 20). On the other hand, when the phoneme boundary resetting part 42*a* does not finish the modification for all the phonemes in the real voice prosody information in the modification section (No in Op 19), the process returns to Op 11, followed by repeated processes in Op 11 to Op 18 performed with respect to an unmodified phoneme in the real voice prosody information in the modification section.

As described above, according to the prosody modification device 4 of the present embodiment, the real voice speech rate calculating part 41*d* calculates the rate of speech of the real voice prosody information for each phoneme to be modified in the speech rata calculation range based on the total sum of the real voice phoneme lengths of the respective phonemes and the number of phonemes or morae in the speech rate calculation range. Further, the regular speech rate calculating part 41*f* calculates the rate of speech of the regular prosody information for each phoneme to be modified in the speech rata calculation range based on the total sum of the regular phoneme lengths of the respective phonemes and the number of phonemes or morae in the speech rate calculation range. Further, the speech rate ratio calculating part 41*g* calculates the ratio between the rate of speech of the real voice prosody information and the rate of speech of the regular prosody information as a speech rate ratio. The phoneme boundary resetting part 42*a* calculates a modified phoneme length based on the regular phoneme length of each of the phonemes and the calculated speech rate ratio in the section, and resets the real voice phoneme boundary of the real voice prosody information so that each real voice phoneme length in the section becomes the modified phoneme length, thereby modifying the real voice prosody information. In this manner, since the speech rate ratio is applied to the locally appropriate regular phoneme length, the modified real voice prosody information comprehensively is close to an utterance in a real voice. In other words, the modified real voice prosody information is prosody information in which a tendency of a human real voice to change due to a rhythm is reproduced. As a result, it is possible to modify the real voice prosody information extracted erroneously from a human utterance without impairment of the naturalness and expressiveness of a human real voice and without time and trouble.

[Embodiment 3]

Figure 11:
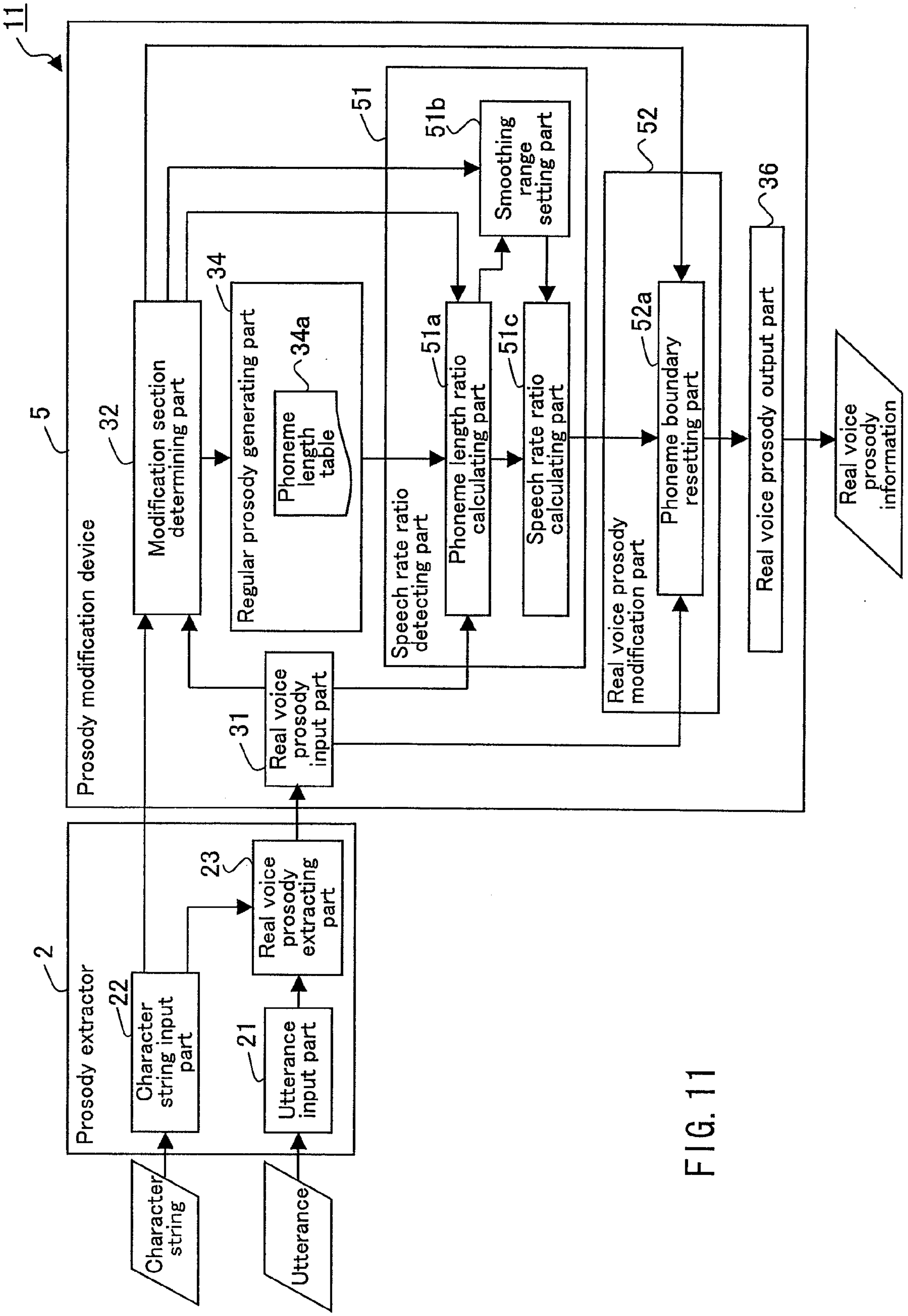
FIG. 11 is a block diagram showing a schematic configuration of a prosody modification system according to Embodiment 3 of the present invention.

FIG. 11 is a block diagram showing a schematic configuration of a prosody modification system 11 according to the present embodiment. The prosody modification system 11 according to the present embodiment includes a prosody modification device 5 instead of the prosody modification device 3 shown in FIG. 1. In FIG. 11, the components having the same functions as those of the components in FIG. 1 are denoted with the same reference numerals, and detailed descriptions thereof will be omitted.

Figure 12:
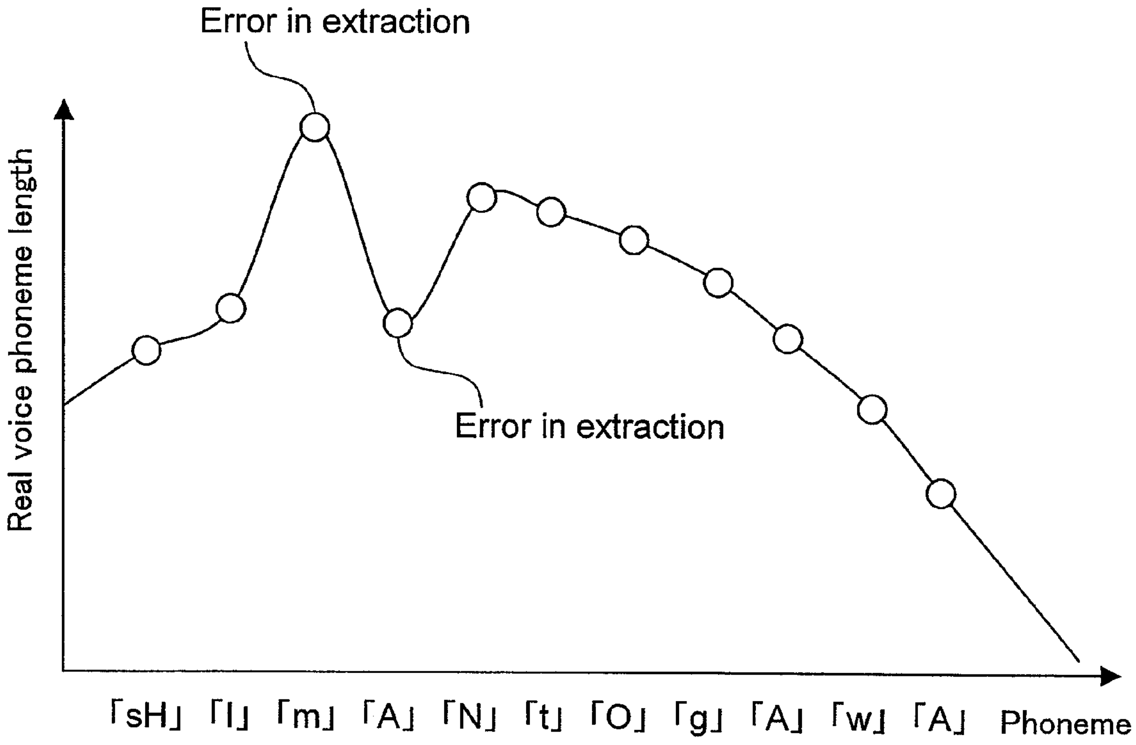
FIG. 12 is a graph for explaining the relationship between each phoneme and a real voice phoneme length of the phoneme in real voice prosody information extracted by a real voice prosody extracting part in the prosody modification system.

In the present embodiment, it is assumed that the real voice prosody extracting part 23 extracts real voice prosody information representing "四万十川 (shimantogawa)" for convenience of explanation unlike in Embodiments 1 and 2. FIG. 12 is a graph for explaining the relationship between each of phonemes of "sH", "I", "m", "A", "N", "t", "O", "g", "A", "w", and "A" of the real voice prosody information extracted by the real voice prosody extracting part 23 and a real voice phoneme length of each of the phonemes. In the example shown in FIG. 12, it is assumed that a real voice phoneme boundary that determines a boundary between the phonemes of "m" and "A" is set erroneously to a great extent. Accordingly, in the example shown in FIG. 12, the real voice phoneme length of the phoneme of "m" becomes longer than an actual real voice phoneme length, and the real voice phoneme length of the phoneme of "A" becomes shorter than an actual phoneme length. Consequently, when synthetic speech is generated by using the real voice prosody information shown in FIG. 12, the synthetic speech is prosodically unnatural in portions of the phonemes of "m" and "A".

Figure 13:
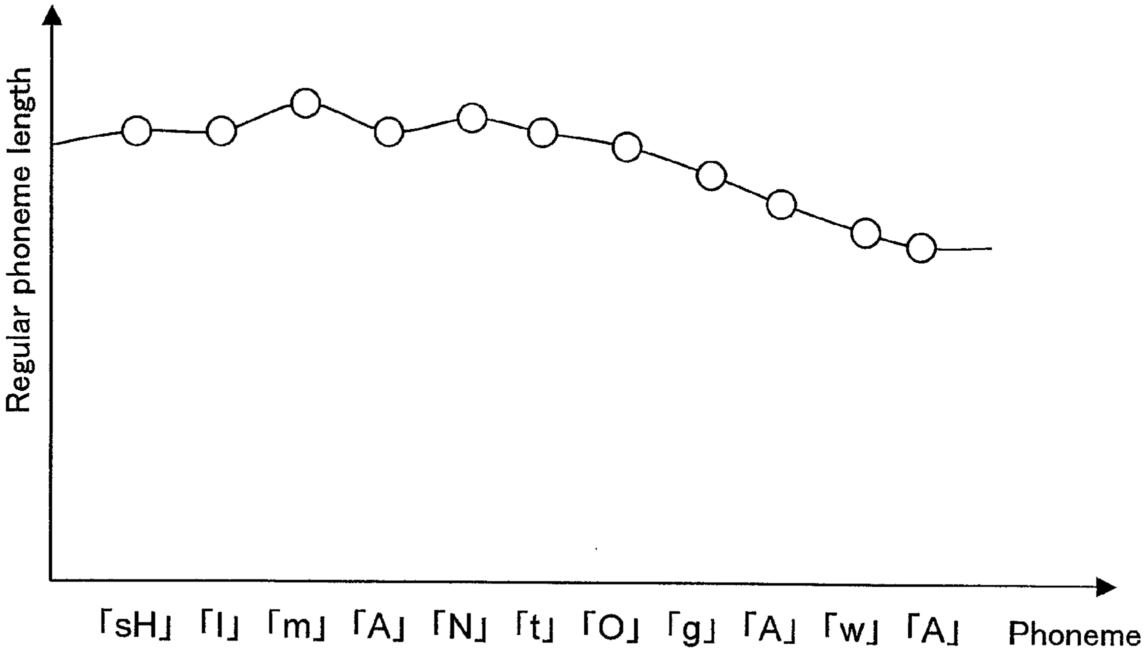
FIG. 13 is a graph for explaining the relationship between each phoneme and a regular phoneme length of the phoneme in regular prosody information generated by a regular prosody generating part in the prosody modification system.

Further, in the present embodiment, it is assumed, for convenience of explanation, that the character string input part 22 receives a character string representing "シマントガワ" ("shimantogawa"), converts the received character string into character string data of "sHImANtOgAwA", and outputs the obtained character string dagta, unlike in Embodiments 1 and 2. Furthermore, in the present embodiment, it is assumed that the modification section determining part 32 determines a modification section composed of the eleven phonemes of "sH", "I", "m", "A", "N", "t", "O", "g", "A", "w", and "A" based on the character string data of "sHImANtOgAwA" output from the character string input part 22. Accordingly, in the present embodiment, the regular prosody generating part 34 generates regular prosody information representing "四万十川". FIG. 13 is a graph for explaining the relationship between each of the phonemes of "sH", "I", "m", "A", "N", "t", "O", "g", "A", "w", and "A" of the regular prosody information generated by the regular prosody generating part 34 and a regular phoneme length of each of the phonemes. While the regular prosody information shown in FIG. 13 is statistically appropriate prosody information, this information is less expressive (has a small change in a rhythm) as compared with the real voice prosody information shown in FIG. 12.

[Configuration of Prosody Modification Device]

The prosody modification device 5 includes a speech rate ratio detecting part 51 and a real voice prosody modification part 52 instead of the speech rate detecting part 33 and the real voice prosody modification part 35 shown in FIG. 1. The speech rate ratio detecting part 51 and the real voice prosody modification part 52 are embodied also by an operation of a CPU of a computer in accordance with a program for realizing the functions of these parts.

The speech rate ratio detecting part 51 includes a phoneme length ratio calculating part 51*a*, a smoothing range setting part 51*b*, and a speech rate ratio calculating part 51*c*.

Figure 14:
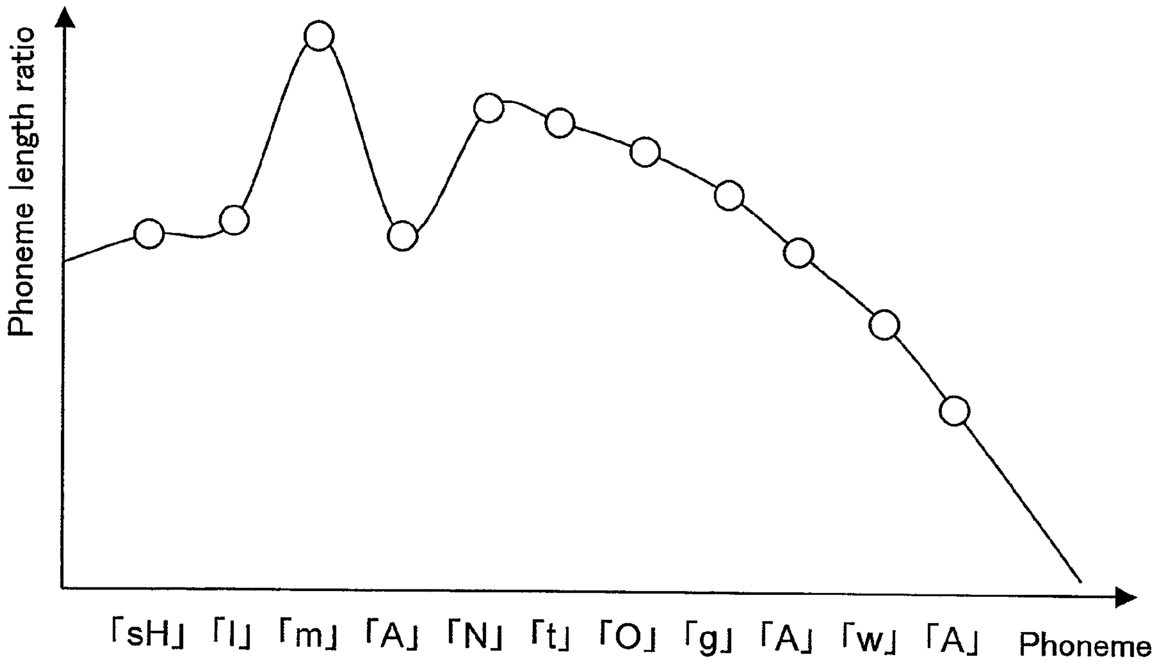
FIG. 14 is a graph for explaining the relationship between each phoneme and a phoneme length ratio of the phoneme.

The phoneme length ratio calculating part 51*a* calculates as a phoneme length ratio a ratio of the real voice phoneme length of each of the phonemes to the regular phoneme length of each of the phonemes in the modification section. In the present embodiment, the phoneme length ratio calculating part 51*a* initially calculates as a phoneme length ratio a ratio of the real voice phoneme length to the regular phoneme length of the phoneme of "sH". Then, the phoneme length ratio calculating part 51*a* repeats this operation with respect to the remaining phonemes of "I", "m", "A", "N", "t", "O", "A", "w", and "A". In this manner, the phoneme length ratio calculating part 51*a* calculates the phoneme length ratio of each of the phonemes. FIG. 14 is a graph for explaining the relationship between each of the phonemes of "sH", "I", "m", "A", "N", "t", "O", "g", "A", "w", and "A" and the phoneme length ratio of each of the phonemes. The phoneme length ratio calculating part 51*a* outputs each of the calculated phoneme length ratios to the smoothing range setting part 51*b* and the speech rate ratio calculating part 51*c*.

The smoothing range setting part 51*b* sets a smoothing range, i.e., a range with respect to which each of the phoneme length ratios calculated by the phoneme length ratio calculating part 51*a* is smoothed to calculate a speech rate ratio. In the present embodiment, it is assumed that the smoothing range setting part 51*b* sets as a smoothing range five phonemes including an arbitrary phoneme at its center. The smoothing range setting part 51*b* outputs the set smoothing range to the speech rate ratio calculating part 51*c*.

Preferably, the smoothing range setting part 51*b* dynamically changes the setting of the smoothing range in accordance with the environment of a phoneme. For example, the smoothing range setting part 51*b* sets the smoothing range to be broader with respect to a phoneme in a section of the real voice prosody information that is likely to be extracted erroneously, such as a section of successive voiced vowels, and sets the smoothing range to be narrower with respect to a phoneme in a section of the real voice prosody information that is less likely to be extracted erroneously, such as a section including many boundaries between a voiced sound and an unvoiced sound. As a result, it becomes possible to calculate a rate of speech with higher importance being placed on a real voice with respect to a portion where the real voice prosody information is less likely to be extracted erroneously, and to calculate a more stable rate of speech with respect to a portion where the real voice prosody information is likely to be extracted erroneously. Therefore, it becomes possible to calculate a rate of speech that is close to a rhythm of a real voice and is stable as a whole.

The smoothing range setting part 51*b* may include a change detecting part that detects a change of the phoneme length ratio. Here, the change detecting part detects a portion where the phoneme length ratio becomes large or small sharply from the respective phoneme length ratios calculated by the phoneme length ratio calculating part 51*a*. As a result, the smoothing range setting part 51*b* can set the smoothing range to be broader with respect to a phoneme whose phoneme length ratio is changed sharply. In this case, for example, the smoothing range setting part 51*b* may calculate a differential value of the detected phoneme length ratio to set a value proportional to the calculated differential value as a smoothing range.

Figure 15:
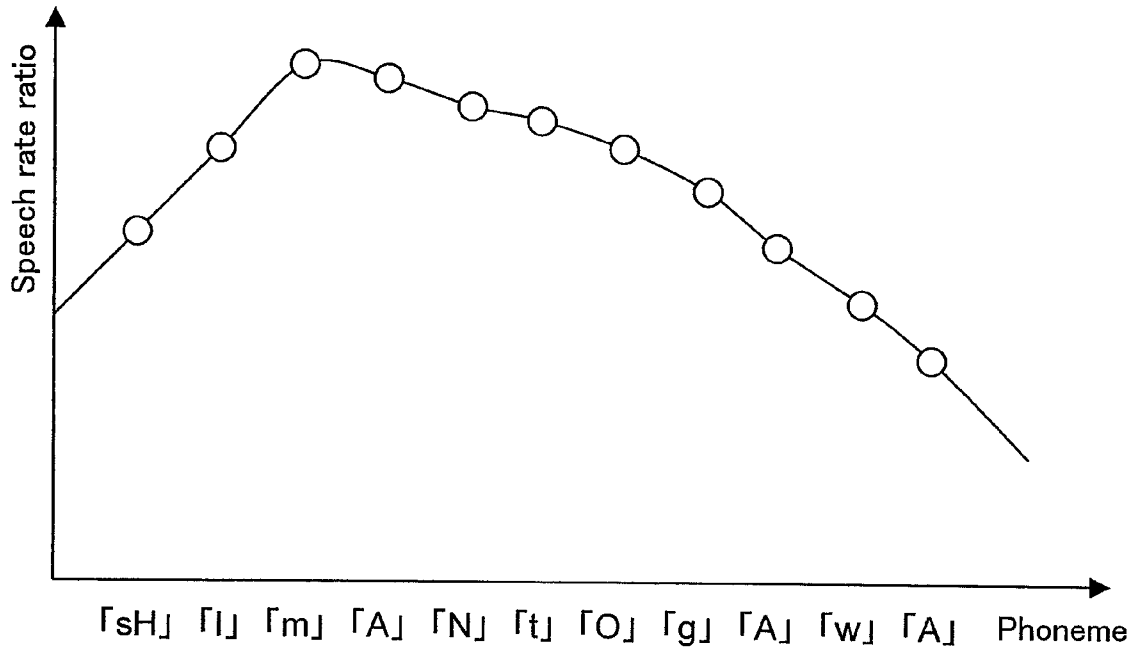
FIG. 15 is a graph for explaining the relationship between each phoneme and a phoneme length ratio of each smoothed phoneme.

With respect to the phoneme length ratio of each of the phonemes in the modification section, the speech rate ratio calculating part 51*c* smoothes each phoneme length ratio in the smoothing range set by the smoothing range setting part 51*b*, and calculates the smoothing result as a speech rate ratio. In the present embodiment, the speech rate ratio calculating part 51*c* calculates an average value of the phoneme length ratios of the respective phonemes in the smoothing range, thereby calculating the speech rate ratio. The speech rate ratio calculating part 51*c* may calculate a weighted average of the phoneme length ratios of the respective phonemes in the smoothing range. For example, the speech rate ratio calculating part 51*c* calculates an average value of the phoneme length ratios of the respective phonemes in the smoothing range by assigning a small weight to a phoneme length ratio of a phoneme with respect to which the real voice prosody information is likely to be extracted erroneously, and assigning a large weight to a phoneme length ratio of a phoneme with respect to which the real voice prosody information is less likely to be extracted erroneously. FIG. 15 is a graph for explaining the relationship between each of the phonemes of “sH”, “I”, “m”, “A”, “N”, “t”, “O”, “g”, “A”, “w”, and “A” and the speech rate ratio of each of the phonemes obtained by the smoothing (note that the graph shown in FIG. 15 indicates a reciprocal of each of the speech rate ratios). The speech rate ratio calculating part 51*c* outputs the speech rate ratio obtained by the smoothing to the real voice prosody modification part 52.

Figure 16:
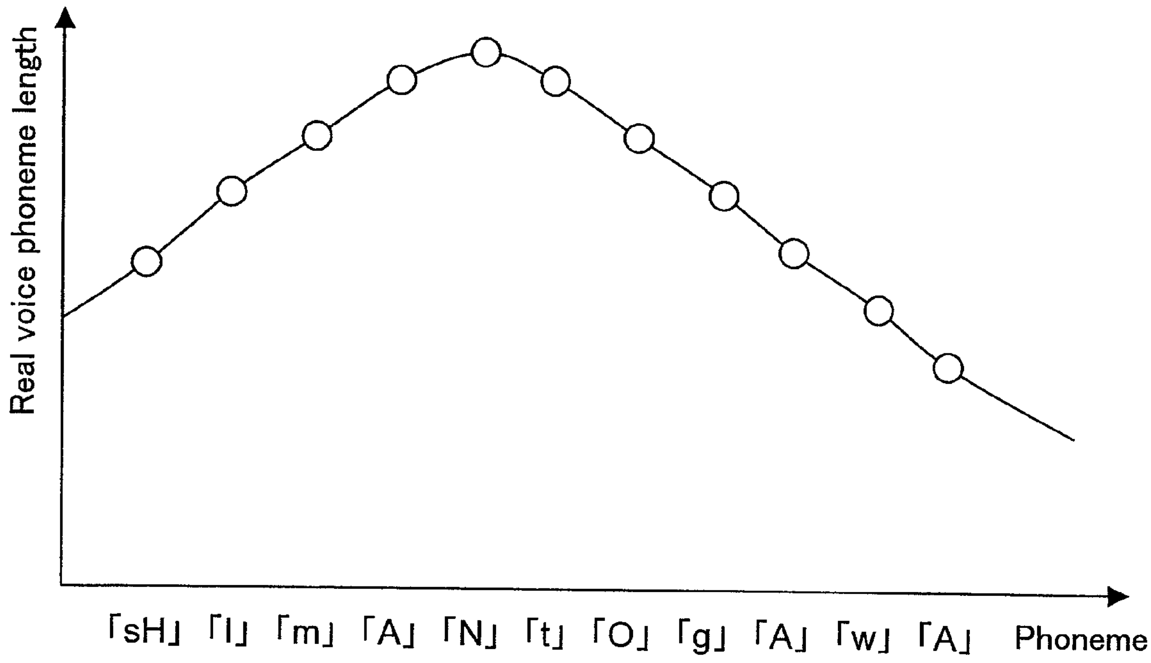
FIG. 16 is a graph for explaining the relationship between each phoneme and a real voice phoneme length of the phoneme in real voice prosody information modified by a phoneme boundary resetting part in the prosody modification system.

The real voice prosody modification part 52 includes a phoneme boundary resetting part 52*a*. The phoneme boundary resetting part 52*a* resets the real voice phoneme boundary of the real voice prosody information so that a real voice phoneme length of each of the phonemes in the modification section becomes a phoneme length of each phoneme obtained by multiplying each of the regular phoneme lengths in the modification section by a reciprocal of the speech rate ratio of each of the phonemes output from the speech rate ratio calculating part 51*c*, thereby modifying the real voice prosody information. In the present embodiment, the phoneme boundary resetting part 52*a* initially multiplies the regular phoneme length of each of the phonemes shown in FIG. 13 by the reciprocal of the speech rate ratio of each of the phonemes shown in FIG. 15. As a result, a modified phoneme length of each of the phonemes is calculated. The phoneme boundary resetting part 52*a* resets the real voice phoneme boundary so that the real voice phoneme length of each of the phonemes shown in FIG. 12 becomes the newly calculated modified phoneme length of each of the phonemes, thereby modifying the real voice prosody information. FIG. 16 is a graph for explaining the relationship between each of the phonemes of “sH”, “I”, “m”, “A”, “N”, “t”, “O”, “g”, “A”, “w”, and “A” and the modified real voice phoneme length of each of the phonemes. In other words, the real voice prosody information shown in FIG. 16 is the result of modifying the erroneously extracted prosody information shown in FIG. 12. This is because the speech rate ratio obtained by the smoothing is applied to the statistically appropriate regular prosody information. The phoneme boundary resetting part 52*a* outputs the modified real voice prosody information to the real voice prosody output part 36.

[Operation of Prosody Modification Device]

Figure 17:
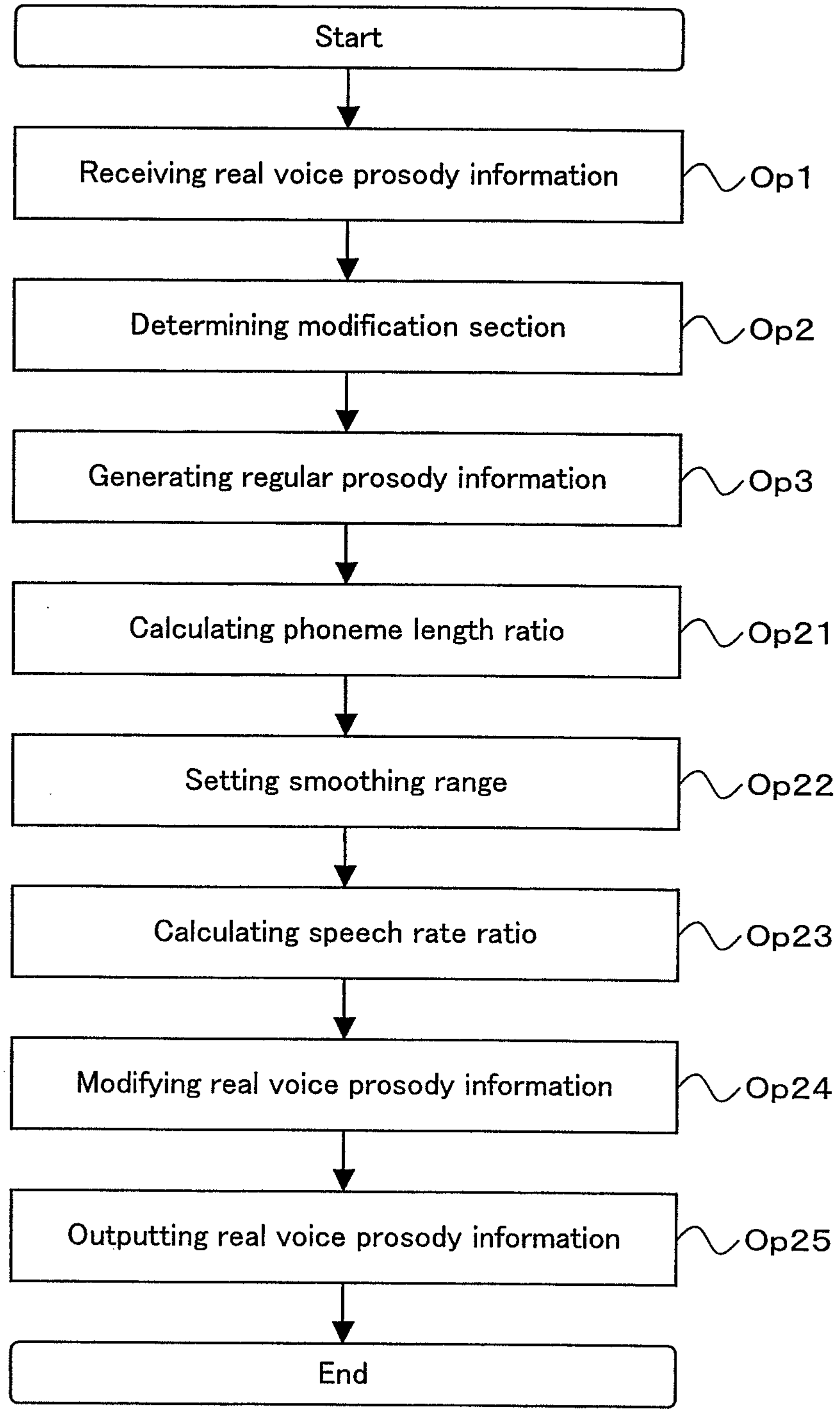
FIG. 17 is a flow chart showing an example of an operation of a prosody modification device in the prosody modification system.

Next, an operation of the prosody modification device 5 with the above-described configuration will be described with reference to FIG. 17. In FIG. 17, the parts showing the same processes as those in FIG. 7 are denoted with the same reference numerals, and detailed descriptions thereof will be omitted.

FIG. 17 is a flow chart showing an example of the operation of the prosody modification device 5. The operations in Op 1 and Op 2 shown in FIG. 17 are the same as those in Op 1 and Op 2 shown in FIG. 7. In Op 3 shown in FIG. 17, almost the same operation as that in Op 4 shown in FIG. 7 is performed except that the regular prosody generating part 34 does not receive the speech rate information. Thus, in Op 3 shown in FIG. 17, the regular prosody generating part 34 generates regular prosody information corresponding to an arbitrary rate of speech.

After Op 3, the phoneme length ratio calculating part 51*a* calculates as a phoneme length ratio the ratio of the real voice phoneme length to the regular phoneme length of each of the phonemes in the modification section (Op 21). The smoothing range setting part 51*b* sets the smoothing range, i.e., a range with respect to which the phoneme length ratio of each of the phonemes calculated in Op 21 is smoothed to calculate the speech rate ratio (Op 22).

Then, with respect to the phoneme length ratio of each of the phonemes in the modification section, the speech rate ratio calculating part 51*c* smoothes a phoneme length ratio of each phoneme in the smoothing range set in Op 22, and calculates the smoothing result as a speech rate ratio (Op 23). The phoneme boundary resetting part 52*a* resets the real voice phoneme boundary of the real voice prosody information so that a real voice phoneme length of each of the phonemes in the modification section becomes a modified phoneme length of each phoneme obtained by multiplying each of the regular phoneme lengths in the modification section by a reciprocal of the speech rate ratio of each of the phonemes calculated in Op 23, thereby modifying the real voice prosody information (Op 24). The real voice prosody output part 36 outputs the real voice prosody information modified in Op 24 to the outside of the real voice prosody modification device 5 (Op 25). In FIG. 17, the processes in Op 22 to Op 24 may be repeated with respect to each of the phonemes in the modification section.

As described above, according to the prosody modification device 5 of the present embodiment, the phoneme length ratio calculating part 51*a* calculates the ratio between the real voice phoneme length of each of the phonemes determined by the real voice phoneme boundary and the regular phoneme length of each of the phonemes determined by the regular phoneme boundary as a phoneme length ratio of each of the phonemes in the section. The speech rate ratio calculating part 51*c* smoothes each of the calculated phoneme length ratios, thereby calculating the ratio between the rate of speech of the real voice prosody information and the rate of speech of the regular prosody information as a speech rate ratio. The phoneme boundary resetting part 52*a* calculates a modified phoneme length based on the regular phoneme length of each of the phonemes of the regular prosody information and the calculated speech rate ratio in the section, and resets the real voice phoneme boundary of the real voice prosody information so that each real voice phoneme length in the section becomes the modified phoneme length, thereby modifying the real voice prosody information. In this manner, since the speech rate ratio is applied to the locally appropriate regular phoneme length, the modified real voice prosody information comprehensively is close to an utterance in a real voice. In other words, the modified real voice prosody information is prosody information in which a tendency of a human real voice to change due to a rhythm is reproduced. As a result, it is possible to modify the real voice prosody information extracted erroneously from a human utterance without impairment of the naturalness and expressiveness of a human real voice and without time and trouble.

[Embodiment 4]

Figure 18:
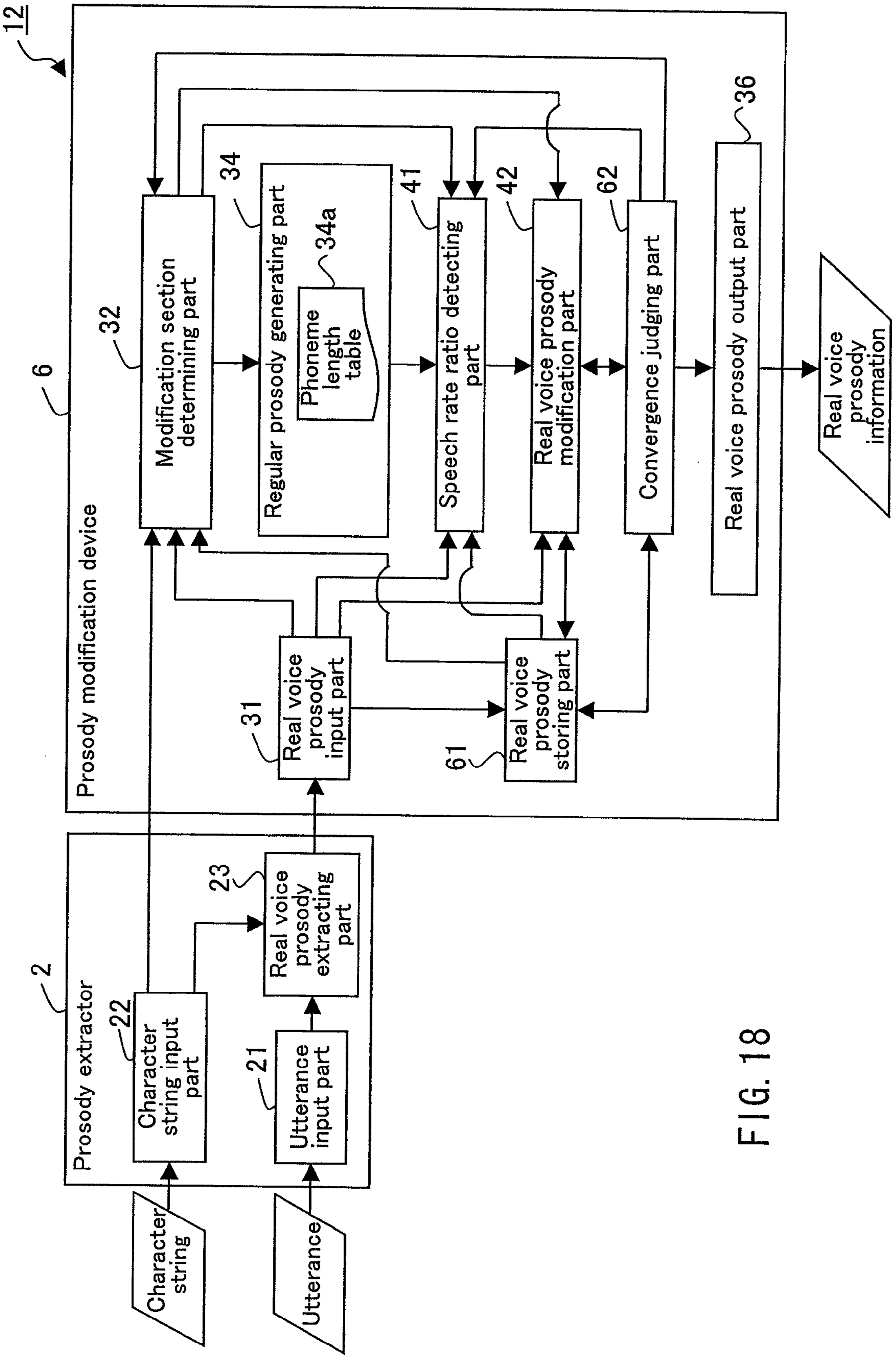
FIG. 18 is a block diagram showing a schematic configuration of a prosody modification system according to Embodiment 4 of the present invention.

FIG. 18 is a block diagram showing a schematic configuration of a prosody modification system 12 according to the present embodiment. The prosody modification system 12 according to the present embodiment includes a prosody modification device 6 instead of the prosody modification device 4 shown in FIG. 9. In FIG. 18, the components having the same functions as those of the components in FIG. 9 are denoted with the same reference numerals, and detailed descriptions thereof will be omitted. Further, with respect to the speech rate ratio detecting part 41 shown in FIG. 18, each of its constituent members 41*a* to 41*g* is not shown. With respect to the real voice prosody modification part 42 shown in FIG. 18, the phoneme boundary resetting part 42*a* is not shown.

The prosody modification device 6 includes a real voice prosody storing part 61 and a convergence judging part 62 in addition to the components of the prosody modification device 4 shown in FIG. 9. The convergence judging part 62 is embodied also by an operation of a CPU of a computer in accordance with a program for realizing the function of this part.

The real voice prosody storing part 61 stores the real voice prosody information received by the real voice prosody input part 31 or the real voice prosody information modified by the real voice prosody modification part 42. The real voice prosody storing part 61 initially stores the real voice prosody information output from the real voice prosody input part 31.

The convergence judging part 62 judges whether or not a difference between the real voice phoneme length of the real voice prosody information output from the real voice prosody modification part 42 and the real voice phoneme length of the unmodified real voice prosody information stored in the real voice prosody storing part 61 is not less than a threshold value. For example, the convergence judging part 62 sums up differences for individual real voice phoneme lengths, and judge whether or not a total sum thereof is not less than a threshold value. Alternatively, for example, the convergence judging part 62 takes the largest difference among differences for individual real voice phoneme lengths as a representative value, and judge whether or not the representative value is not less than a threshold value. When the difference is not less than the threshold value, the convergence judging part 62 writes the real voice prosody information output from the real voice prosody modification part 42 in the real voice prosody storing part 61. As a result, the real voice prosody information modified by the real voice prosody modification part 42 is stored newly in the real voice prosody storing part 61. In this case, the convergence judging part 62 instructs the speech rate ratio detecting part 41 to calculate the speech rate ratio again. Further, the convergence judging part 62 instructs the real voice prosody modification part 42 to modify the real voice prosody information stored in the real voice prosody storing part 61 again. At this time, the convergence judging part 62 may output the result of the difference to the modification section determining part 32, and the modification section determining part 32 may determine only a range of a large difference as a new modification section. As a result, only a portion of a major error can be considered to be modified.

Upon receipt of the instruction from the convergence judging part 62, the speech rate ratio detecting part 41 reads out the real voice prosody information stored in the real voice modification storing part 61, and calculates a new speech rate ratio in the modification section. The real voice prosody modification part 42, upon receipt of the instruction from the convergence judging part 62, reads out the real voice prosody information stored in the real voice prosody storing part 61, and modifies the real voice prosody information by using the new speech rate ratio calculated by the speech rate ratio detecting part 41.

On the other hand, when the difference is less than the threshold value, the convergence judging part 62 outputs the real voice prosody information output from the real voice prosody modification part 42 to the real voice prosody output part 36. The threshold value is recorded in advance in a memory provided in the convergence judging part 62, while it is not limited thereto. For example, the threshold value may be set as appropriate by an administrator of the prosody modification system 12. Alternatively, the threshold value may be changed according to the phoneme string.

As described above, according to the prosody modification device 6 of the present embodiment, the convergence judging part 62 judges whether or not the difference between the real voice phoneme length of the real voice prosody information modified by the real voice prosody modification part 42 and the real voice phoneme length of the unmodified real voice prosody information stored in the real voice prosody storing part 61 is not less than the threshold value. When the difference is not less than the threshold value, the convergence judging part 62 writes the real voice prosody information modified by the real voice prosody modification part 42 in the real voice prosody storing part 61, and instructs the real voice prosody modification part 42 to modify the real voice prosody information. On the other hand, when the difference is less than the threshold value, the convergence judging part 62 outputs the real voice prosody information modified by the real voice prosody modification part 42. As a result, the convergence judging part 62 can output the real voice prosody information in which the real voice phoneme boundary is more approximate to an actual real voice phoneme boundary.

In the above-described example, the convergence judging part 62 judges whether or not the difference between the real voice phoneme length of the real voice prosody information output from the real voice prosody modification part 42 and the real voice phoneme length of the unmodified real voice prosody information stored in the real voice prosody storing part 61 is not less than the threshold value, while it is not limited thereto. For example, the convergence judging part 62 may judge whether or not a difference between the real voice phoneme length of the real voice prosody information output from the real voice prosody modification part 42 and the regular phoneme length of the regular prosody information generated by the regular prosody generating part 44 is not less than the threshold value. This allows the convergence judging part 62 to output the real voice prosody information in which the real voice phoneme boundary is more approximate to the regular phoneme boundary.

Further, in the above-described example, the prosody modification device 6 shown in FIG. 18 includes the real voice prosody storing part 61 and the convergence judging part 62 in addition to the components of the prosody modification device 4 shown in FIG. 9, while it is not limited thereto. Namely, a prosody modification device including the real voice prosody storing part and the converging judging part in addition to the components of the prosody modification device 5 shown in FIG. 11 also can be applied to the present embodiment.

[Embodiment 5]

Figure 19:
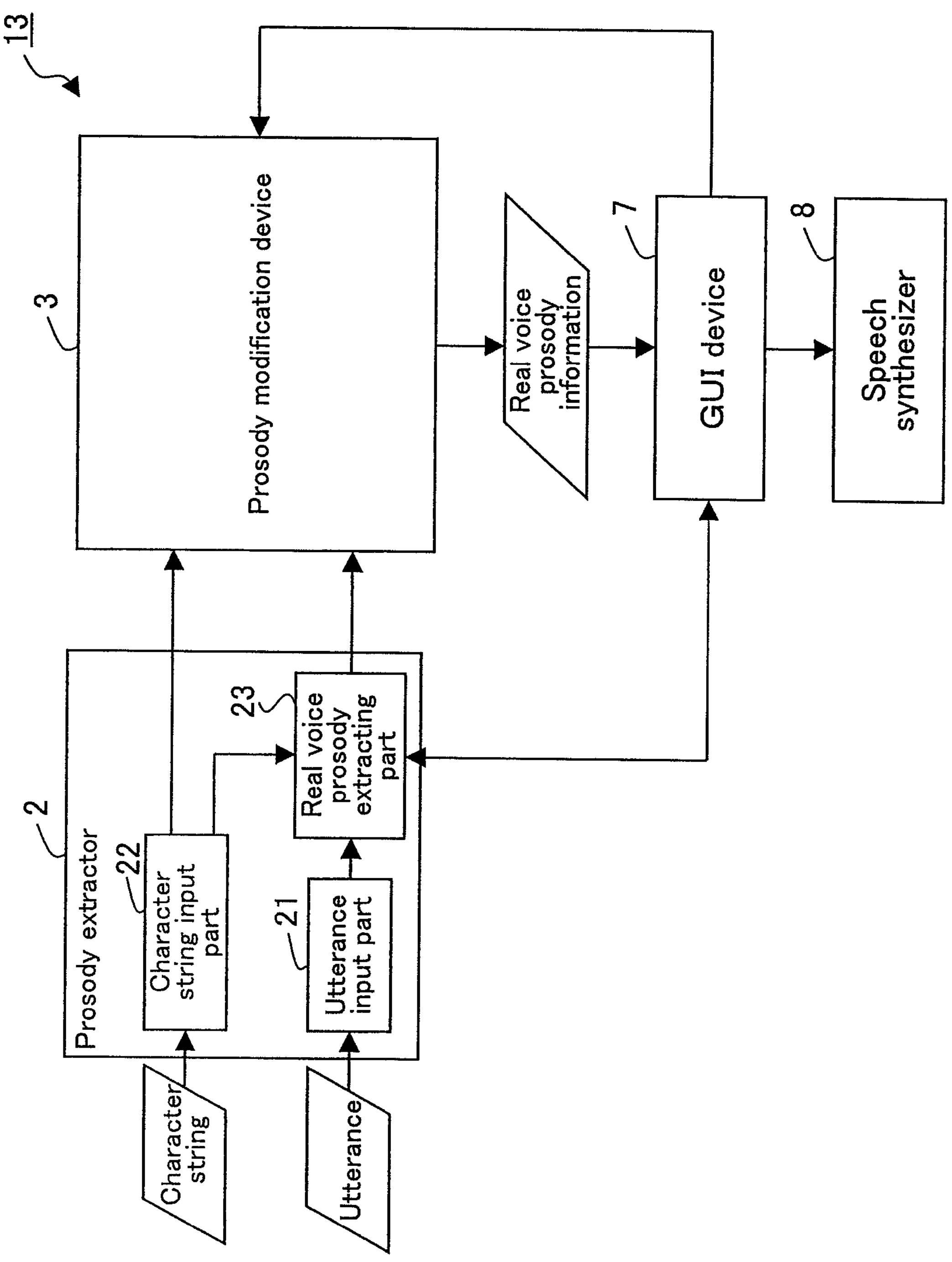
FIG. 19 is a block diagram showing a schematic configuration of a prosody modification system according to Embodiment 5 of the present invention.

FIG. 19 is a block diagram showing a schematic configuration of a prosody modification system 13 according to the present embodiment. The prosody modification system 13 according to the present embodiment includes a GUI (Graphical User Interface) device 7 and a speech synthesizer 8 in addition to the components of the prosody modification system 1 shown in FIG. 1. In FIG. 19, the components having the same functions as those of the components in FIG. 1 are denoted with the same reference numerals, and detailed descriptions thereof will be omitted. Further, with respect to the prosody modification device 3 shown in FIG. 19, each of its constituent members 32 to 36 is not shown. The GUI device 7 and the speech synthesizer 8 may be provided in any of the prosody modification system 1*a* shown in FIG. 5, the prosody modification system 1*b* shown in FIG. 6, the prosody modification system 10 shown in FIG. 9, the prosody modification system 11 shown in FIG. 11, and the prosody modification system 12 shown in FIG. 18.

In the present embodiment, it is assumed that the real voice prosody extracting part 23 extracts from the speech data output from the utterance input part 21 real voice prosody information about a voice pitch, an intonation, and the like in addition to the real voice prosody information about a rhythm, unlike in Embodiments 1 to 4.

Figure 20:
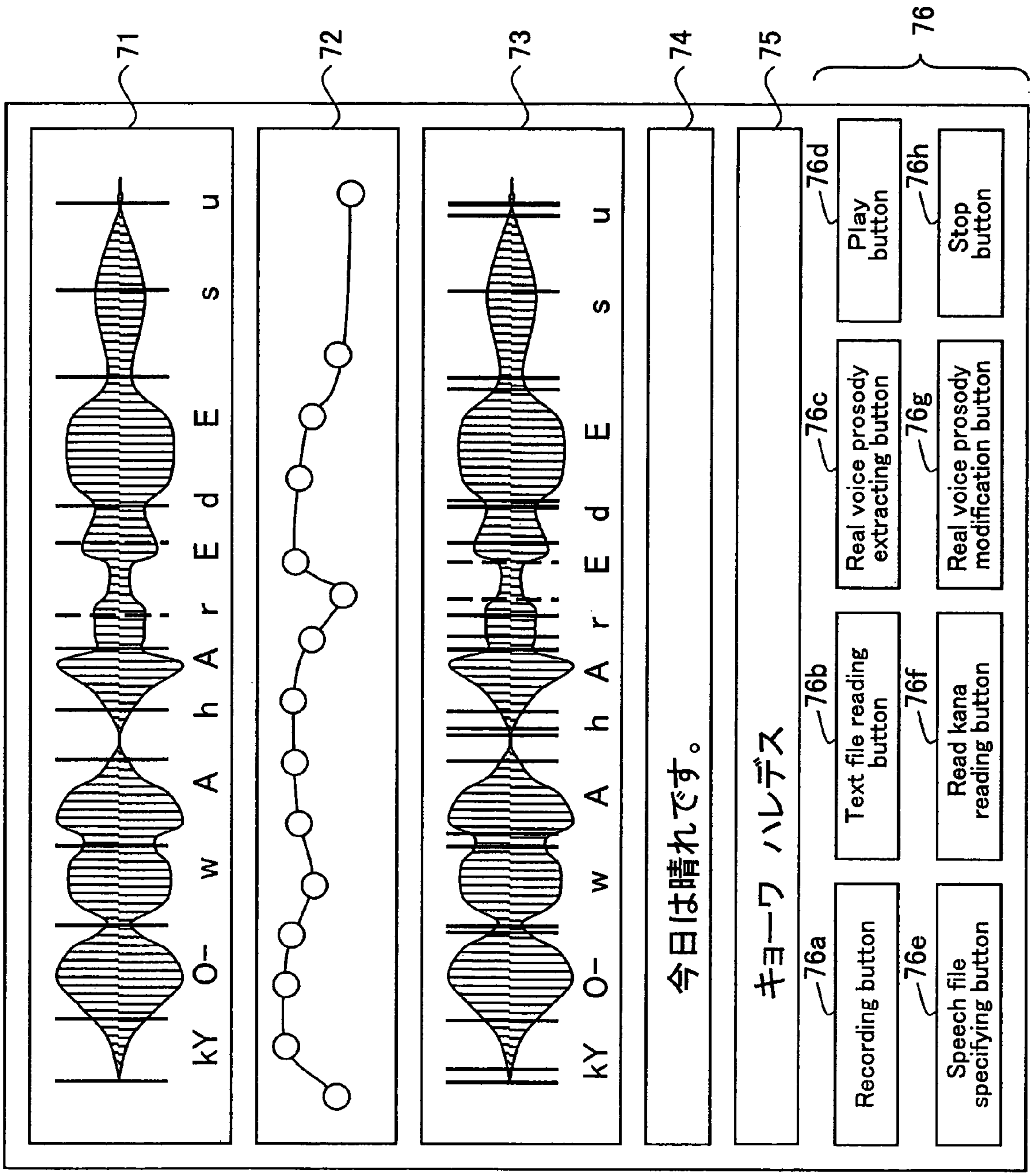
FIG. 20 is a conceptual diagram showing an example of a display on a screen of a GUI device in the prosody modification system.

The GUI device 7 allows an administrator of the prosody modification system 13 to edit the real voice prosody information output from the prosody modification device 3. To this end, the GUI device 7 provides a user interface function of displaying the real voice prosody information to the administrator and allowing the administrator to operate a pointing device such as a mouse and a keyboard. FIG. 20 is a conceptual diagram showing an example of a display screen of the GUI device 7. As shown in FIG. 20, the display screen of the GUI device 7 includes a real voice waveform display part 71, a pitch pattern display part 72, a synthetic waveform display part 73, an utterance content input part 74, a read kana (Japanese phonetic symbol) input part 75, and an operation part 76. The GUI device 7 may allow the administrator to edit the real voice prosody information extracted by the real voice prosody extracting part 23 in addition to the real voice prosody information output from the prosody modification device 3.

The real voice waveform display part 71 displays waveform information of speech input to the utterance input part 21 and the real voice prosody information about a rhythm modified by the prosody modification device 3. More specifically, the real voice waveform display part 71 displays speech data in the form of a speech waveform, on which a phoneme boundary is displayed, and a corresponding phoneme type. In the example shown in FIG. 20, the real voice waveform display part 71 displays phonemes of "kY" "O–", "w", "A", "h", "A", "r" "E", "d", "E", "s", and "u", and respective real voice phoneme boundaries reset by the prosody modification device 3. Further, the real voice waveform display part 71 displays a real voice phoneme boundary with respect to which a difference between the real voice phoneme boundary of the real voice prosody information modified by the prosody modification device 3 and the real voice phoneme boundary of the unmodified real voice prosody information is larger than a threshold value in such a manner that it can be distinguished from the other real voice phoneme boundaries. For example, the real voice waveform display part 71 uses a different color for the real voice phoneme boundary, or alternatively, allows the real voice phoneme boundary to flash. In the example shown in FIG. 20, since differences for a real voice phoneme boundary between the phonemes of "r" and "E" and a real voice phoneme boundary between the phonemes of "E" and "d" are larger than the threshold value, the real voice waveform display part 71 allows these real voice phoneme boundaries to flash (shown by dotted lines in FIG. 20) so that they can be distinguished from the other real voice phoneme boundaries. In the present embodiment, the real voice waveform display part 71 allows the displayed real voice phoneme boundary to be moved by an operation of the administrator with a pointing device, so that the real voice phoneme boundary can be reset.

The pitch pattern display part 72 displays the real voice prosody information about a voice pitch output from the prosody modification device 3. More specifically, the pitch pattern display part 72 displays a pitch pattern (fundamental frequency). The pitch pattern is time-series data representing a change in a voice pitch or an intonation with time. In the example shown in FIG. 20, the pitch pattern display part 72 displays control points represented with marks ○ and a pitch pattern obtained by connecting the control points. In the present embodiment, the pitch pattern display part 72 allows the pitch pattern or the control points to be moved by an operation of the administrator with a pointing device, so that the pitch pattern or the control points can be reset. For example, in the case of moving a control point, the administrator brings a pointer of a mouse into contact with the control point to be moved, moves (drags) the contact position (indicated position) upward or downward, and drops at a desired position, whereby the control point is disposed at the desired position, for example. In this case, the pitch pattern between the control points is corrected automatically. Preferably, the pitch pattern display part 72 displays the pitch pattern in such a manner that it is superimposed on a spectrogram.

The synthetic waveform display part 73 displays a waveform of synthetic speech generated based on the real voice prosody information output from the prosody modification device 3. In the example shown in FIG. 20, the synthetic waveform display part 73 displays the waveform of the synthetic speech, the phonemes of "kY" "O–", "w", "A", "h", "A", "r" "E", "d", "E", "s", and "u", the respective real voice phoneme boundaries reset by the prosody modification device 3, and the respective real voice phoneme boundaries reset by the real voice waveform display part 71.

The utterance content input part 74 allows the administrator to input a character string representing the same content as that of a real voice uttered by a human in a mixture of Chinese characters and Japanese syllabary characters. In the example shown in FIG. 20, the utterance content input part 74 allows the administrator to input "今日は晴れで" ("kyo-waharedesu").

The read kana input part 75 allows the administrator to input a read kana of the character string input to the utterance content input part 74 in square Japanese characters. In the example shown in FIG. 20, the read kana input part 75 allows the administrator to input "キョーワハレデス".

The operation part 76 includes a recording button 76*a*, a text file reading button 76*b*, a real voice prosody extracting button 76*c*, a play button 76*d*, a speech file specifying button 76*e*, a read kana reading button 76*f*, a prosody modification button 76*g*, and a stop button 76*h*.

The recording button 76*a* is provided for recording a real voice uttered by a human. The text file reading button 76*b* is provided for reading a previously prepared text file of a character string. The real voice prosody extracting button 76*c* is provided for instructing the real voice prosody extracting part 23 to extract the real voice prosody information. The play button 76*d* is provided for playing speech data input to the utterance input part 21 or synthetic speech data generated based on the real voice prosody information output from the prosody modification device 3. The speech file specifying button 76*e* is provided for specifying a previously prepared file of speech data. The read kana reading button 76*f* is provided for reading a previously prepared text file of a read kana. The real voice prosody modification button 76*g* is provided for instructing the prosody modification device 3 to modify the real voice prosody information. The stop button 76*h* is provided for stopping playing synthetic speech data.

The speech synthesizer 8 has a function of outputting (playing) synthetic speech output from the GUI device 7. To this end, the speech synthesizer 8 includes a speaker or the like. The speech synthesizer 8 plays synthetic speech data generated based on the real voice prosody information extracted by the real voice prosody extracting part 23, the synthetic speech data generated based on the real voice prosody information modified by the prosody modification device 3, and the synthetic speech data generated based on the real voice prosody information edited by the GUI device 7. Consequently, the administrator can compare the respective synthetic speeches by listening to the same.

As described above, according to the prosody modification system 13 of the present embodiment, the GUI device 7 allows the real voice prosody information modified by the prosody modification device 3 to be edited. Since the real voice prosody information modified by the prosody modification device 3 is edited by the GUI device 7, the administrator can make a fine adjustment to the real voice prosody information, for example.

As described above, the present invention is useful as a prosody generating device including a real voice prosody input part that receives real voice prosody information extracted from an utterance of a human and a real voice prosody modification part that modifies the real voice prosody information received by the real voice prosody input part, a prosody modification method, or a recording medium storing a prosody generating program.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A prosody modification device comprising:

a real voice prosody input part that receives real voice prosody information extracted from an utterance of a human;

a modification section determining part that determines a modification section that includes the phoneme or the phoneme string which are to be modified in the real voice prosody information, based on a kind of a phoneme string of the real voice prosody information;

a regular prosody generating part that generates regular prosody information having a regular phoneme boundary that determines a boundary between phonemes and a regular phoneme length of a phoneme by using data representing a regular or statistical phoneme length in an utterance of a human with respect to the modification section; and a real voice prosody modification part that resets a real voice phoneme boundary of the phoneme or the phoneme string to be modified in the real voice prosody information by using the regular prosody information generated by the regular prosody generating part so that the real voice phoneme boundary and a real voice phoneme length of the phoneme or the phoneme string to be modified in the real voice prosody information are approximate to an actual phoneme boundary and an actual phoneme length of the utterance of the human, thereby modifying the real voice prosody information.

2. The prosody modification device according to claim 1, wherein the real voice prosody modification part includes a phoneme boundary resetting part that resets the real voice phoneme boundary of the phoneme or the phoneme string to be modified in the real voice prosody information based on a ratio of the regular phoneme length of each phoneme determined by the regular phoneme boundary in the section of the phoneme or the phoneme string to be modified, thereby modifying the real voice prosody information.

3. The prosody modification device according to claim 1, wherein the real voice prosody modification part includes a phoneme boundary resetting part that resets the real voice phoneme boundary of the phoneme or the phoneme string to be modified in the real voice prosody information based on the regular phoneme length of each phoneme of the regular prosody information and a speech rate ratio as a ratio between a rate of speech of the real voice prosody information and a rate of speech of the regular prosody information in the section of the phoneme or the phoneme string to be modified, thereby modifying the real voice prosody information.

4. The prosody modification device according to claim 3, further comprising a speech rate ratio detecting part that calculates, in a speech rate calculation range composed of at least one or more phonemes or morae including the phoneme to be modified in the real voice prosody information, the rate of speech of the real voice prosody information for the phoneme to be modified based on a total sum of the real voice phoneme lengths of respective phonemes determined by the real voice phoneme boundary and the number of phonemes or morae in the speech rate calculation range, as well as the rate of speech of the regular prosody information for the phoneme to be modified based on a total sum of the regular phoneme lengths of the respective phonemes determined by the regular phoneme boundary and the number of phonemes or morae in the speech rate calculation range, and calculates the ratio between the rate of speech of the real voice prosody information and the rate of speech of the regular prosody information as the speech rate ratio, wherein the phoneme boundary resetting part calculates a modified phoneme length based on the regular phoneme length of each of the phonemes of the regular prosody information and the speech rate ratio calculated by the speech rate ratio detecting part in the section of the phoneme or the phoneme string to be modified, and resets the real voice phoneme boundary of the real voice prosody information so that each real voice phoneme length in the section becomes the modified phoneme length, thereby modifying the real voice prosody information.

5. The prosody modification device according to claim 3, further comprising:

a phoneme length ratio calculating part that calculates a ratio between the real voice phoneme length of each phoneme determined by the real voice phoneme boundary and the regular phoneme length of the phoneme determined by the regular phoneme boundary as a phoneme length ratio of the phoneme in the section of the phoneme or the phoneme string to be modified in the real voice prosody information; and a speech rate ratio calculating part that smoothes the phoneme length ratio calculated by the phoneme length ratio calculating part, thereby calculating the ratio between the rate of speech of the real voice prosody information and the rate of speech of the regular prosody information as the speech rate ratio, wherein the phoneme boundary resetting part calculates a modified phoneme length based on the regular phoneme length of the phoneme of the regular prosody information and the speech rate ratio calculated by the speech rate ratio calculating part in the section of the phoneme or the phoneme string to be modified, and resets the real voice phoneme boundary of the real voice prosody information so that each real voice phoneme length in the section becomes the modified phoneme length, thereby modifying the real voice prosody information.

6. The prosody modification device according to claim 1, comprising:

a real voice prosody storing part that stores the real voice prosody information received by the real voice prosody input part or the real voice prosody information modified by the real voice prosody modification part; and a convergence judging part that writes the real voice prosody information modified by the real voice prosody modification part in the real voice prosody storing part and instructs the real voice prosody modification part to modify the real voice prosody information when a difference between the real voice phoneme length of the real voice prosody information modified by the real voice prosody modification part and the real voice phoneme length of the unmodified real voice prosody information stored in the real voice prosody storing part is not less than a threshold value, as well as outputs the real voice prosody information modified by the real voice prosody modification part when the difference between the real voice phoneme length of the real voice prosody information modified by the real voice prosody modification part and the real voice phoneme length of the unmodified real voice prosody information stored in the real voice prosody storing part is less than the threshold value.

7. A Graphical User Interface device that allows the real voice prosody information modified by the prosody modification device according to claim 1 to be edited.

8. A speech synthesizer that outputs synthetic speech generated based on the real voice prosody information modified by the prosody modification device according to claim 1.

9. A speech synthesizer that outputs synthetic speech generated based on the real voice prosody information edited by the Graphical User Interface device according to claim 7.

10. A prosody modification method comprising:

a real voice prosody input operation in which a real voice prosody input part provided in a computer receives real voice prosody information extracted from an utterance of a human;

a modification section determining operation that determines a modification section that includes the phoneme or the phoneme string which are to be modified in the real voice prosody information, based on a kind of a phoneme string of the real voice prosody information;

a regular prosody generating operation in which a regular prosody generating part provided in the computer generates regular prosody information having a regular phoneme boundary that determines a boundary between phonemes and a regular phoneme length of a phoneme by using data representing a regular or statistical phoneme length in an utterance of a human with respect to the modification section; and a real voice prosody modifying operation in which a real voice prosody modification part provided in the computer resets a real voice phoneme boundary of the phoneme or the phoneme string to be modified in the real voice prosody information by using the regular prosody information generated in the regular prosody generating operation so that the real voice phoneme boundary and a real voice phoneme length of the phoneme or the phoneme string to be modified in the real voice prosody information are approximate to an actual phoneme boundary and an actual phoneme length of the utterance of the human, thereby modifying the real voice prosody information.

11. A non-transitory recording medium storing a prosody modification program that allows a computer to execute:

a real voice prosody input process of receiving real voice prosody information extracted from an utterance of a human;

a modification section determination process of determining the section that includes the phoneme or the phoneme string which are to be modified in the real voice prosody information, based on a kind of a phoneme string of the real voice prosody information;

a regular prosody generation process of generating regular prosody information having a regular phoneme boundary that determines a boundary between phonemes and a regular phoneme length of a phoneme by using data representing a regular or statistical phoneme length in an utterance of a human with respect to the modification section; and a real voice prosody modification process of resetting a real voice phoneme boundary of the phoneme or the phoneme string to be modified in the real voice prosody information by using the regular prosody information generated in the regular prosody generation process so that the real voice phoneme boundary and a real voice phoneme length of the phoneme or the phoneme string to be modified in the real voice prosody information are approximate to an actual phoneme boundary and an actual phoneme length of the utterance of the human, thereby modifying the real voice prosody information.

* * * * *